(12) United States Patent
Shelton et al.

(10) Patent No.: US 7,246,567 B2
(45) Date of Patent: Jul. 24, 2007

(54) REMOTE OPERATED VEHICLES

(75) Inventors: Chris D. Shelton, London (GB); Nigel Mark Jagger, Trinity (GB); Shaun David Househam, London (GB); Lawrence Samuel Tyson, Sutton (GB); Jeremy Daniel Cooper, London (GB); Michael William Dormer, Basingstoke (GB); Jan Matteo Paoli, London (GB); Nicholas Ian Kempt, London (GB); Mark Sanders, Windsor (GB); Graham Michael Pullin, London (GB); Jaime Valls Miro, London (GB); Frances Samalionis, London (GB); Paul South, London (GB); Tracy Currer, London (GB); Steve O'Connor, London (GB); Martin Bontoft, London (GB)

(73) Assignee: H2EYE (International) Limited, Road Town, Tortola (VG)

( * ) Notice: Subject to any disclaimer, the term of this patent is extended or adjusted under 35 U.S.C. 154(b) by 0 days.

(21) Appl. No.: 11/113,590

(22) Filed: Apr. 25, 2005

(65) Prior Publication Data
US 2005/0204992 A1 Sep. 22, 2005

Related U.S. Application Data

(60) Division of application No. 10/695,080, filed on Oct. 28, 2003, which is a division of application No. 09/928,258, filed on Aug. 10, 2001, now Pat. No. 6,662,742, which is a continuation-in-part of application No. PCT/GB01/00527, filed on Feb. 9, 2001.

(30) Foreign Application Priority Data
Feb. 10, 2000 (GB) ................... 0003108.8

(51) Int. Cl.
B63G 8/00 (2006.01)
(52) U.S. Cl. ...................... 114/312
(58) Field of Classification Search ................ 114/312; 441/2
See application file for complete search history.

(56) References Cited

U.S. PATENT DOCUMENTS 2,883,684 A * 4/1959 Correll ....................... 114/382

(Continued)

FOREIGN PATENT DOCUMENTS

DE 24 34 890 11/1975

(Continued)

OTHER PUBLICATIONS

Taro Aoki et al., "Developmental of Expendable Optical Fiber Cable ROV 'UROV'", IEEE, pp. 813-818, 1992.

Primary Examiner—Stephen Avila
(74) Attorney, Agent, or Firm—Renner, Otto, Boisselle & Sklar LLP

(57) ABSTRACT

An ROV comprising a topside, a fish and an umbilical cable for connecting the topside and the fish together. The fish is adapted to be powered by an onboard battery inductively coupled to the fish. The cable is of a fine diameter to reduce drag through the water. RF transmissions carry control and return signals to and from the fish and topside. The fish has two cameras. The front facing camera is located behind a dual layer flooded dome. A pan and tilt mechanism is fitted to one of the cameras and uses a pivotable gimbal frame driven by a lead nut moving along an arcuate bolt.

17 Claims, 19 Drawing Sheets

U.S. PATENT DOCUMENTS

| | | | |
|---|---|---|---|
| 3,840,795 A | 10/1974 | Roszyk et al. | |
| 3,891,037 A | 6/1975 | Well et al. | |
| 4,030,058 A | 6/1977 | Riffe et al. | |
| 4,049,883 A | 9/1977 | Schenk et al. | |
| 4,399,322 A | 8/1983 | Hafner, Jr. | |
| 4,491,939 A | 1/1985 | Carpenter | |
| 4,503,377 A | 3/1985 | Kitabayashi et al. | |
| 4,563,758 A | 1/1986 | Paternostro | |
| 4,714,439 A | 12/1987 | Marabotto et al. | |
| 4,759,973 A | 7/1988 | Phillips et al. | |
| 4,775,039 A * | 10/1988 | Sunakawa | 477/11 |
| 4,838,797 A | 6/1989 | Dodier | |
| 4,839,873 A * | 6/1989 | Cochrane et al. | 367/133 |
| 4,928,319 A | 5/1990 | Pitt et al. | |
| 5,201,884 A | 4/1993 | Nicholas | |
| 5,448,151 A | 9/1995 | Ganse et al. | |
| 5,471,667 A | 11/1995 | Yamada | |
| 5,528,002 A | 6/1996 | Katabami | |
| 5,543,244 A | 8/1996 | Klink et al. | |
| 5,680,028 A | 10/1997 | McEachern | |
| 5,749,312 A | 5/1998 | Hillenbrand et al. | |
| 6,050,869 A | 4/2000 | Kellett | |
| 6,223,675 B1 * | 5/2001 | Watt et al. | 114/312 |
| 6,276,625 B1 | 8/2001 | Chee et al. | |

FOREIGN PATENT DOCUMENTS

| | | |
|---|---|---|
| EP | 0 179 426 A2 | 10/1985 |
| EP | 0 272 516 A2 | 6/1988 |
| EP | 0 405 002 A1 | 1/1991 |
| EP | 0 425 723 A | 5/1991 |
| EP | 0 115 045 A1 | 8/1994 |
| FR | 1 529 806 A | 5/1967 |
| GB | 499037 | 1/1939 |
| GB | 2 050 525 A | 3/1980 |
| GB | 2 141 684 A | 1/1985 |
| GB | 2 177 352 A | 1/1987 |
| GB | 2 212 451 A | 7/1989 |
| GB | 2 305 412 A | 4/1997 |
| GB | 2 305 412 A | 9/1997 |
| JP | 4058180 A | 6/1990 |
| JP | 080298103 A | 11/1996 |
| JP | 11074848 A | 8/1997 |
| JP | 110224653 A | 8/1999 |
| WO | 97/16054 | 5/1997 |
| WO | 98/36507 | 8/1998 |
| WO | 99/09683 | 2/1999 |

* cited by examiner

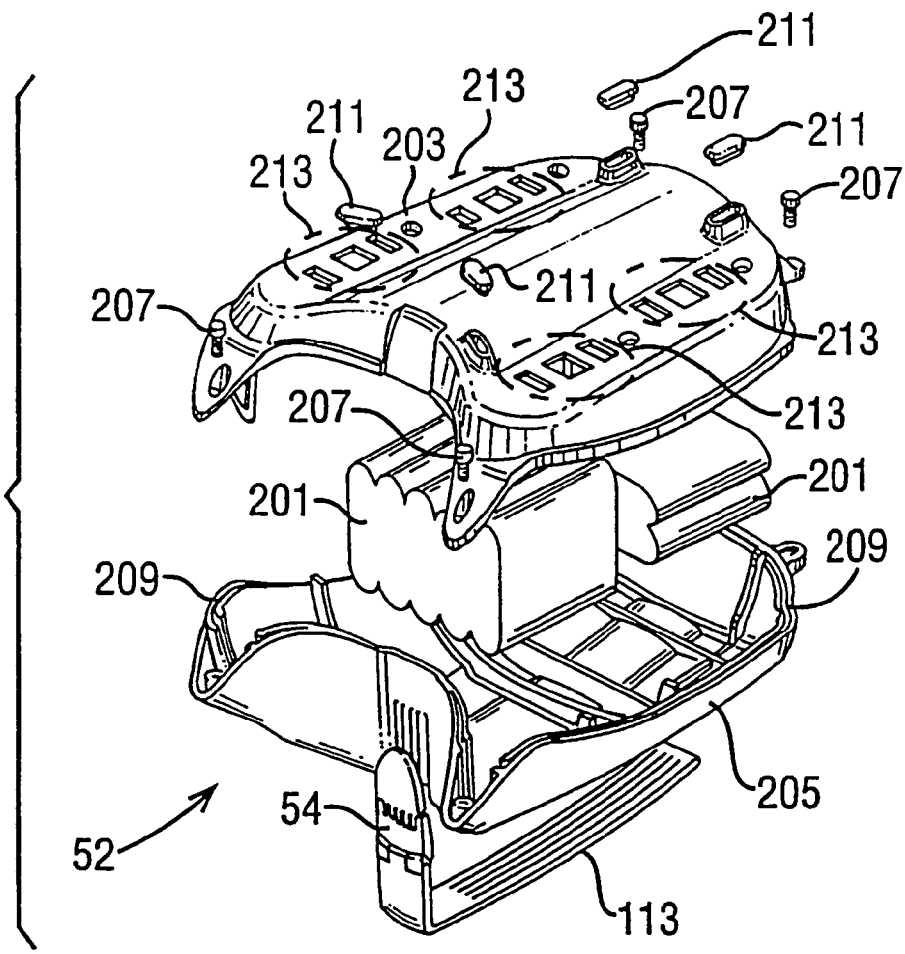
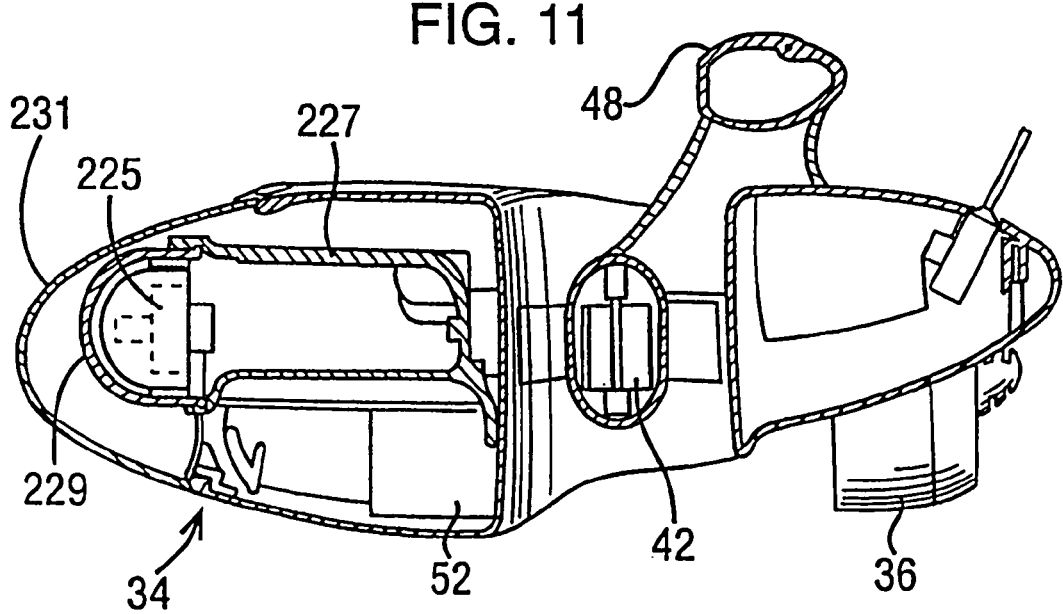

FIG. 13A
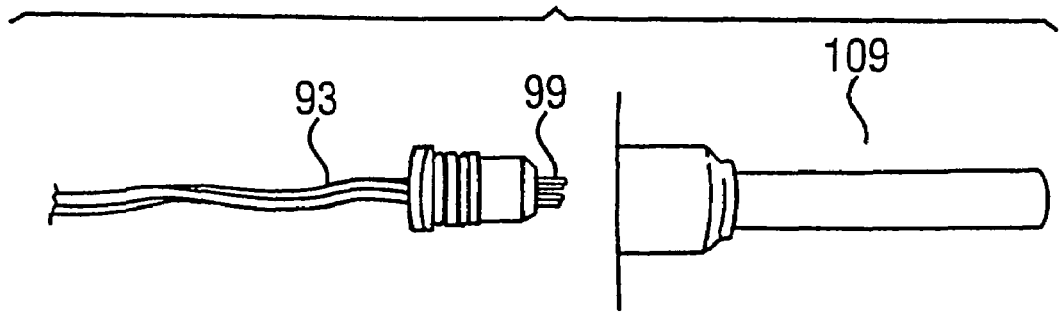
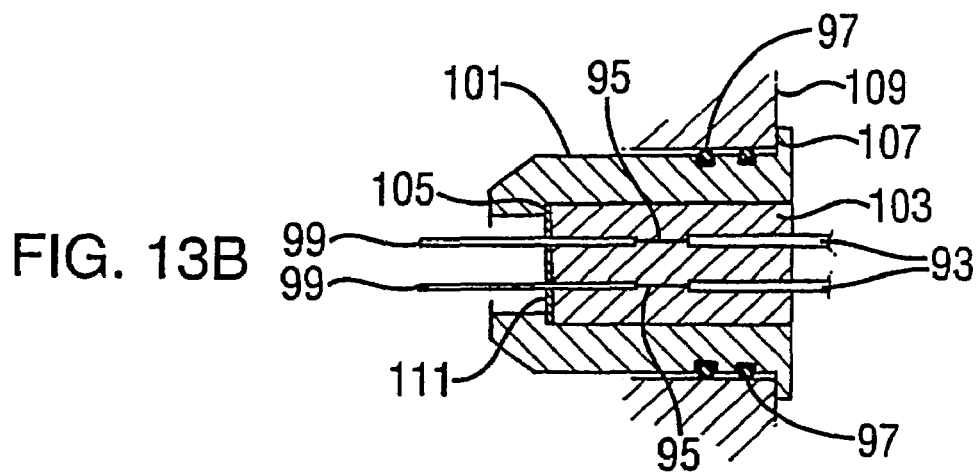
FIG. 13B
FIG. 13C
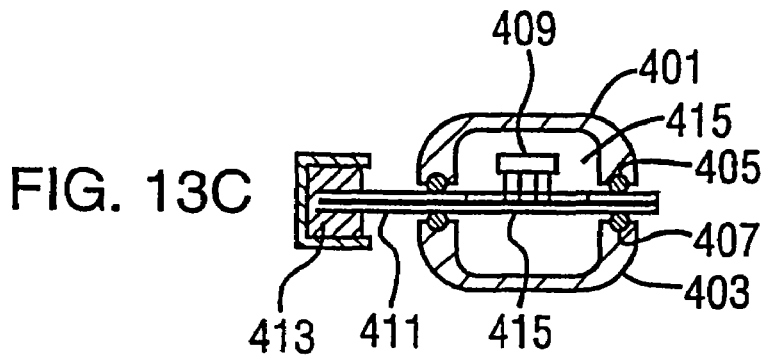
FIG. 13D
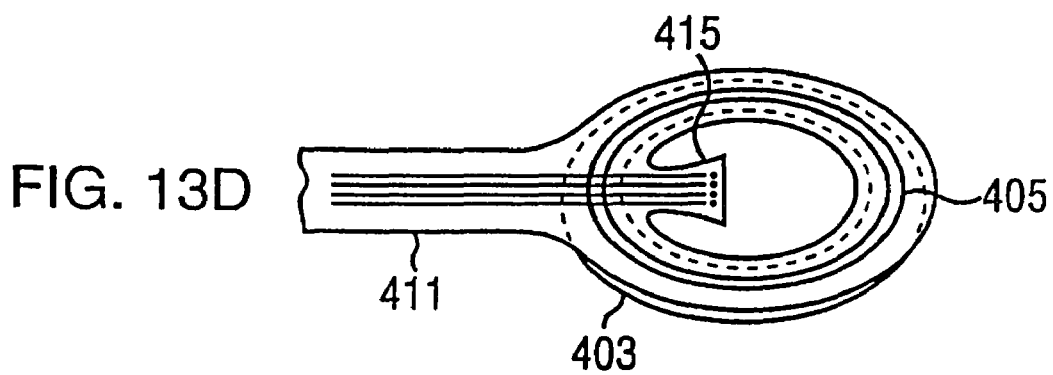

REMOTE OPERATED VEHICLES

This application is a divisional of U.S. patent application Ser. No. 10/695,080 filed Oct. 28, 2003, which is a divisional of U.S. patent application Ser. No. 09/928,258 filed on Aug. 10, 200, now U.S. Pat. No. 6,662,742 issued Dec. 16, 2003, which is a continuation-in-part of International Application No. PCT/GB01/00527, filed on Feb. 9, 2001 and published in English, all of which are hereby incorporated herein by reference in their entirety.

BACKGROUND OF THE INVENTION

The present invention relates to remote operated vehicles or ROVs, and in particular to ROVs for use in exploration of an underwater environment.

Conventional ROVs are typically used by commercial enterprises and comprise a "submarine" unit or vehicle (the fish), a landbased remote control unit (the topside) connected to a power source such as a generator or power cells, and an umbilical cable connecting the two units together for transmitting power and control signals from the topside to the fish.

The fish is usually fitted with swimming means, such as motor driven propellers, for maneuvering the fish underwater, and a camera, typically a video camera. Images from the camera can be transmitted from the fish, along the umbilical cable, to the topside for displaying on a monitor or viewfinder attached to the topside. Stills cameras may also be fitted onto the fish allowing more detailed images, i.e. at higher resolutions, to be taken. Other information may also be sent along the cable, such as speed or headings.

The topside is used to transmit control signals down the umbilical cable to the fish for controlling the thrusters and any accessories, or options, such as hydroplanes or grabbers, such as those on arms having gripping means for picking up articles on the seabed, or possibly a pan or tilt mechanism fitted to the camera. It can also be used to transmit power simultaneously.

Commercial ROVs are generally very massive, and therefore cannot be transported from location to location by a single person. They are usually moved by crane onto a ship and are used, for example, for the inspection of subsea pipes and cables. Their large size, and cost, has hindered the development of the use of ROVs for recreational purposes, such as exploring reefs or checking the visibility at a dive sight such as a wreck before incurring diver downtimes. It would therefore be desirable to provide an ROV that can easily be transported by a single person for recreational use.

Small and lightweight ROVs have been recently developed by VideoRay Inc. such as the VideoRay 2000 ROV unit, designed for recreational use. The fish is sufficiently small and lightweight to be carried by one person. However, even with a smaller fish, the power supply together with the umbilical cable for transmitting the power from the surface to the fish are still difficult to manhandle.

According to a first aspect of the present invention, there is provided an ROV comprising a topside, a fish and an umbilical cable for connecting the topside and the fish together, wherein the fish is adapted to be powered by an onboard power supply, the cable has an outer skin and a control-signal carrying core, the core of the umbilical cable having a diameter of less than 2 mm along a substantial portion of the cable's length.

The onboard power supply is preferably in the form of a removable, water-sealed battery. The battery may be fully electrically-insulated. Non-contact coupling means, e.g. reactive coupling such as inductance or capacitance couplings, can be used to extract power from the battery without any need for direct electrically conducting contact means between the battery pack and its adjacent components. Preferably the coupling is by means of inductance coupling.

According to a second aspect of the present invention there is provided an umbilical cable for an ROV for carrying signals between a topside and a fish of the ROV, the fish requiring an onboard power supply, the cable having an outer skin and a control-signal carrying core, wherein the core has a diameter of less than 2 mm along a substantial portion of the cable's length.

Preferably, the diameter is 1.2 mm. Preferably, the core of the cable is a coaxial cable. Coaxial cables allow the transmission therealong of information by frequency division multiplexing, for example RF transmissions. Such transmissions allow a large quantity of information, such as TV, to be transmitted over distances, down fine cables. Therefore, transmission of not only control signals therealong to the fish, but also return signals from the fish to the topside such as video signals can be achieved. However, high power loads such as those required to drive the thrusters on the fish will not be transmittable, other than at very high voltages.

Preferably, the core of the cable is surrounded by linear fibers of a high tensile strength, flexible material, such as Dynema® or Kevlar®. Preferably, the cable comprises a highly buoyant skin to give the cable a positive buoyancy. Preferably a hairy polypropylene braid surrounds the cable. This braid can reduce the drag of the cable through water.

In accordance with another aspect of the present invention, there is provided a fully water-sealed and electrically-insulated battery pack for fitting in or onto an in- or an under-the-water, electrically operated device.

Since the main power for an ROV of the present invention, in use, is carried onboard the fish, there is no need to transmit substantial power down the umbilical cable to the fish. The only energy to be transmitted down the umbilical cable is control signals, e.g. for instructing a control processor provided on the fish for controlling the fish's thrusters, cameras or other accessories.

Preferably, the ROV is fitted with an onboard video camera for streaming video images to the topside. This enables the use of the ROV in providing an "underwater experience", for example via a virtual reality headset. The video images will be transmitted on the umbilical cable from the fish to the topside.

Another aspect of the present invention is the provision of an ROV that has two cameras, one mounted at the front of the fish, the pan and tilt thereof preferably being adjustable for viewing in variable directions underwater, and the second camera being provided in a "periscope" position. Preferably the periscope camera is fitted above the main body of the fish. However, it may also be indirectly positioned in such a position by the provision of periscopic mirror arrangements. The periscope camera can provide, for example, either an alternative view in the water, or, at the water surface, an above-the-water view, for example to assist in directing the fish back to land or to the controller, or to a partially submerged object to be viewed. Pictures from the cameras can be transmitted on the umbilical cable to the topside. However, when the communication system between the fish and the topside cannot handle two video channels, then means for selecting which camera is active can be provided.

The first camera could be a color camera and the second camera could be a monochrome camera, such as a black and white camera. The monochrome camera will generally provide better low-light capabilities than the color camera due both to its conventionally higher resolution, and its adaptability for low-light sensitivity, for example due to its intrinsic higher sensitivity, or by the provision of image intensifying means. Low light sensitivity will allow use of the ROV in reduced light environments such as at depths where the ambient light has been filtered out by the water, or at twilight. Low light capabilities also remove the need continuously to burn lights provided on the fish, e.g. for battery saving purposes.

Another aspect of the present invention is the use of non-contact coupling techniques to transfer power for driving electric components on an underwater device from a water and electrically sealed circuit to a separately water and electrically sealed electric circuit. For example, the primary and ancillary components on a fish of an ROV, such as motors (or thrusters), cameras, illumination devices, and an onboard computer could be powered by induction coupling power from an onboard water and electrically sealed battery. Induction coupling could also be used to transmit the control signals between an umbilical cable and a fish of an ROV through a water and electrically sealed bulkhead.

Preferably, the non-contact power coupling means is inductive, but alternative indirect electrical coupling techniques include optical emitters and receptors or electrostatic transfers across adjacent capacitance plates.

The fish may be provided in modular form, having a number of locations provided about its form for attachment of ancillary components. Each position may be provided with a non-contact communication and power point.

Preferably, for an inductive coupled power point, twin opposed pairs of windings are provided on outer limbs of an E shaped magnetic core and a third coil is provided on the central limb. Induction coupling using this arrangement allows two independent power takeoffs to be obtained at a single point. For example, motor power, which required a high load variable power induction coupling, and a computer's power, which requires a lower load continuous power induction coupling, can be operated simultaneously from a single power source at a single induction coupler point, independently of each other. A number of induction coupler points may be provided on the power supply so that many components can be driven by the power supply simultaneously, but independently of each other.

Multiple point safety interlocks may be provided between the two circuits, i.e. the main body of the fish and its battery or ancillary components, so that the induction points are turned on and off upon fitting or removing either the battery or, optionally, the ancillary components (i.e. options) to or from the fish. This prevents the magnetic core remaining "live" unnecessarily; high power magnetic fields may be hazardous if not contained in a magnetic core.

According to a further aspect of the present invention, there is provided a topside for instructing a fish of an underwater ROV, the topside comprising a wireless handset and a computer unit, the computer unit, in use, being adapted to instruct the fish via an umbilical cable connected to the fish and the computer unit, and the wireless handset being adapted to transmit user defined instructions to the computer unit. This allows a user to roam around the computer unit, within the range of the transmitting means of the handset, or for the handset to be passed between a number of users without a cable connecting the handset to the base unit getting in the way. The computer unit may have a winder attached to it for managing the umbilical cable.

According to a further aspect of the present invention, there is provided a fish for an ROV of the type having a umbilical cable connecting the fish to a topside, the fish being provided with twin, side-mounted, horizontal thrusters, wherein the fish is provided with a position for connecting the umbilical cable thereto at a location directly at or substantially above the mid-point of a line between the twin thrusters. The positioning of the cable attachment position at or directly above such a point prevents any tension from interfering with the directional control of the fish.

According to another aspect of the present invention, there is disclosed a waterproof cable connector for fitting within an aperture in a pressure wall, the connector having an outer sleeve of a size substantially corresponding to, but slightly smaller than, the size of the aperture, and an epoxy filled core supporting the cable to be extended through the pressure wall within the sleeve, the sleeve having two pressure resisting flanges thereon, one for engaging against an outer surface of the pressure wall adjacent the aperture, and one extending radially inwardly from the inner surface of the sleeve for resisting movement of the epoxy when under pressure. The juncture between the epoxy and the second flange may be provided by a pressure resistant planar barrier.

In commercial underwater ROVs, if the fish gets in trouble, for example due to tangling of the umbilical cable about an underwater obstruction, it is necessary for the umbilical cable to be manually released from the fish by a diver. This would be impractical for recreational ROVs since the user would not necessarily have diving equipment. Therefore, according to a further aspect of the present invention, there is provided a release mechanism for the cable for use on an underwater ROV. Preferably, the self popping release mechanism can be activated by the user from the topside. However, the mechanism could also be programmed to release if the umbilical cable snaps. A spring-loaded cable release mechanism may be needed to allow the cable to be released when under tension, for example in a fast water current.

The ROV could log its movements on a particular dive so that it could automatically seek its way back substantially to its starting point upon cable disconnection. For example, ultrasonic locators could be fitted for sensing the fish's position relative to an object in the water, or the seabed.

According to a further aspect of the present invention there is provided a fish for an ROV comprising a camera and a window for the camera, wherein the window is a dual layer window, the first layer, internal of the second window, being sealingly mounted over the camera lens to prevent, in use, water ingress to the camera, and the second layer being positioned over the first window, being adapted to allow flooding of the space between the two layers. The first layer provides at least a part of the pressure housing over the camera. The second layer provides a protection layer for the first layer to prevent the first layer being scratched. Under high pressure, a scratch in the first layer would increase the probability of the layer failing. However, the second layer, is pressurized on both sides due to it being flooded, i.e. under a pressure equilibrium.

The fish of the present invention may be provided with a hydrophone to enable marine sounds to be observed.

A further aspect of the present invention is an underwater communications device comprising a send and receive communications processor and a handset, wherein using the handset, a short text message can be written and transmitted to the communications processor for sending out ultrasonically to a message recipient. The communications processor may be onboard the handset or a fish of an ROV. Two handsets may be provided, each with a send and receive communications processor so that two divers can communicate with each other underwater. The communications device may also be used to enable communication between the diver and the fish, the diver and the topside and the diver and the surface. The communications processor, when provided in the fish, may transmit the message along the umbilical cable. The handset may be in the form of a keypad on the fish, or a wireless handset, and can comprise a screen or a speaker for showing or relaying the message in the water.

The fish may be provided with an onboard computer that automatically corrects any yaw of the fish caused by water currents or drifts dragging the cable. Sensing devices or means could be by way of compass or inertial devices fitted to the fish, which are adapted to inform the computer of the fish's heading, acceleration and speed. The yaw control may alternatively be provided by the topside.

The fish may be provided with a depth-sounder, e.g. to allow fixed height swimming of the fish from the seabed or below the water's surface. Alternatively, the sensing could be horizontal, or in other directions, for allowing the maintenance of the fish at a minimum distance from an object.

Preferably, the onboard power supply of the fish is positioned on the underside of the fish so that it acts as a ballast weight. Further, three feet may be provided on the top of fish so that by inverting the fish onto the three feet, the fish is maintained by the feet in an appropriate position to facilitate mounting or dismounting of ancillary components or the battery pack or power source to or from the fish.

According to a further aspect of the present invention there is provided a pan and tilt mechanism for a camera comprising an arcuate drive bolt fixed relative to a chassis of the mechanism and a pivotable gimbal for mounting the camera thereon, wherein a lead nut mounted to the gimbal can be moved along the bolt to pivot the gimbal. A potentiometer may be operatively connected to the gimbal for detecting the angle about which the gimbal is pivoted.

According to a further aspect of the present invention, there is provided a motor for an ROV thruster, the motor comprising a fixed stator having electromagnet coil windings on core fingers thereof, the stator being positioned within a pressure housing about which is mounted a sealed rotor having permanent magnets and propellers, wherein water is free to circulate between the rotor and the pressure housing.

According to a further aspect of the present invention there is provided a hand controller for an ROV with left and right side thrusters and a vertical thruster, the hand controller comprising: a handle portion shaped for gripping between the fingers and palm of either a left or a right hand; and a first controller mounted for thumb actuation by the gripping left or right hand and configured to provide control signals for a left thruster and a right thruster of the ROV, thereby to control surge and yaw.

The first controller may be further configured to provide control signals for a vertical thruster of the ROV, thereby to control heave.

The hand controller in an embodiment comprises a second controller mounted for index finger actuation by the gripping left or right hand and configured to provide control signals for a vertical thruster of the ROV, thereby to control heave. The second controller may comprise first and second actuation elements for initiating up and down heave motion.

The hand controller preferably comprises a wireless transmitter for transmitting the control signals to a control unit. Alternatively a cable connection between the hand controller and the topside computer unit could be provided.

In an embodiment, the first controller is a joystick. Alternatively, a trackball or other multidimensional manually actuatable input device could be used.

The hand controller may further comprise a camera controller mounted for actuation by another hand and configured to provide further control signals for panning and tilting a camera in the ROV. The hand controller may also further comprise a light controller mounted for actuation by another hand and configured to provide further control signals for switching on and off at least one light in the ROV.

BRIEF DESCRIPTION OF THE DRAWINGS

Preferred embodiments of the present invention will now be described with reference to the accompanying drawings in which:

FIG. 8 is an exploded view of a battery of the present invention;

FIG. 11 is a cross section through the fish of FIG. 2 showing the dual layer flooded dome of the present invention;

FIGS. 13A and 13B show a pressure connector of the present invention and a mount for accepting the connector;

FIGS. 13C and 13D show, in section and plan respectively, an alternative concept for a pressure connector;

DETAILED DESCRIPTION

The ROV

Figure 1:
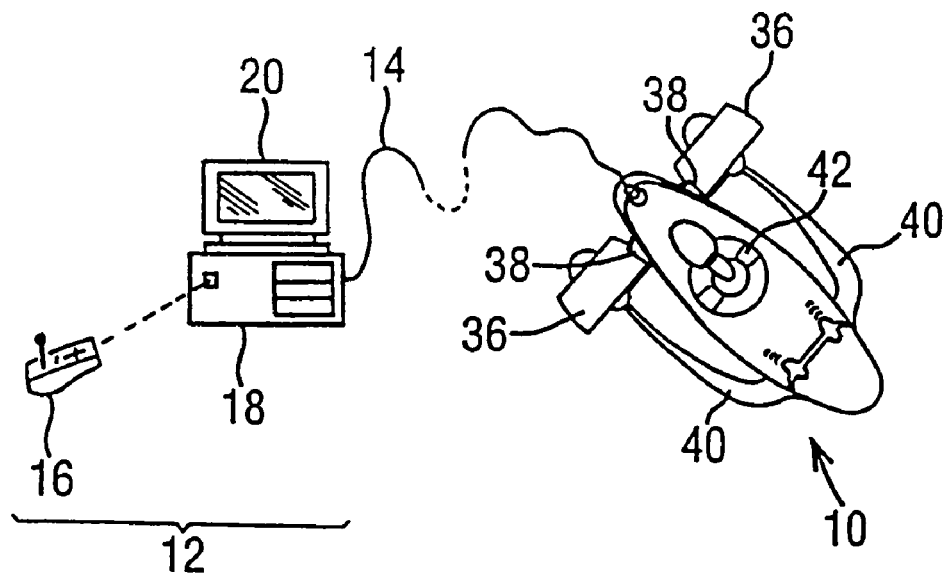
FIG. 1 schematically shows an ROV including a remote handset, a topside, an umbilical cable and a fish.

Referring to FIGS. 1 to 4 there is shown an ROV kit in accordance with the present invention. The ROV is a collection of units which together perform the function of an underwater remotely controlled television camera. The ROV kit comprises two main units, these being the underwater unit or "fish" 10, and the surface control unit or "topside" 12. Joining the two main units is a cable or "umbilical cable" 14. The cable 14 is preferably at least 200 m long and accordingly is, for ease of handling, generally wound onto a winder, not shown.

The Topside 12

The topside 12 comprises a wireless handset 16 and a computer unit 18. During the deployment operations of a fish 10, there are different activities such as launch, depth deployment and recovery of the fish 10 from the water. For these different operations, the operator may need to be in a different place or may need to move about the zone in which the operations take place. The wireless handset makes this easy and safe since there is no wire to cause obstructions, and the operator becomes free to move anywhere within the range of the wireless link.

Included in the topside's computer unit 18 there is a receiver which takes signals from the hand-controller and processes them prior to conveying instructions to the fish's control components via the cable 14.

The wireless communication is in air so can include radio, EM induction, ultrasonic or optical signals, e.g. infrared. The preferred communication means uses radio frequency transmissions.

An RF transmitter 288 is provided to send control signals to the computer unit 18. Windows 289 for viewing information on an LCD 291 are provided on the handset 16 for displaying information to the operator, such as handset battery life and indications of the signals being sent. A zebra strip 293 interconnects the LCD 291 to the PCB 286. There could also be a receiver in the handset 16 so that information transmitted by the fish 10 to the topside 12 can sent by a transmitter from the computer unit 18 to the handset 16 for displaying on the LCD 291 of the handset 16. For example, the fish's depth, heading or attitude or the water's temperature could be shown, or a video stream could be received for a small video screen on the handset 16.

A monitor 20 or view screen is provided for the computer unit 18 for displaying images provided by cameras mounted in the fish 10.

The computer unit 18 includes the circuits needed for frequency division multiplexing, FDM, and time division multiplexing, TDM, of signals on the cable 14. The signals may include the commands from the topside 12 to the fish 10 (telecommand), the commands from the fish 10 to the topside 12 (telemetry), video stream to the topside 12, audio signals to the topside 12, and possibly ultrasonic data from sensors on the fish 10 to the topside 12.

In the preferred embodiment of the present invention, the FDM is allocated as follows:
1. Telemetry and telecommand are TDM on a carrier centered on 5 MHz;
2. Additional bi-directional ("options") data is TDM on a carrier at 5.5 MHz;
3. Audio is centered at 6 Mhz; and
4. Video is centered at 32 MHz and occupies 20–40 MHz.

Handset 16: First Version

Figure 16A:
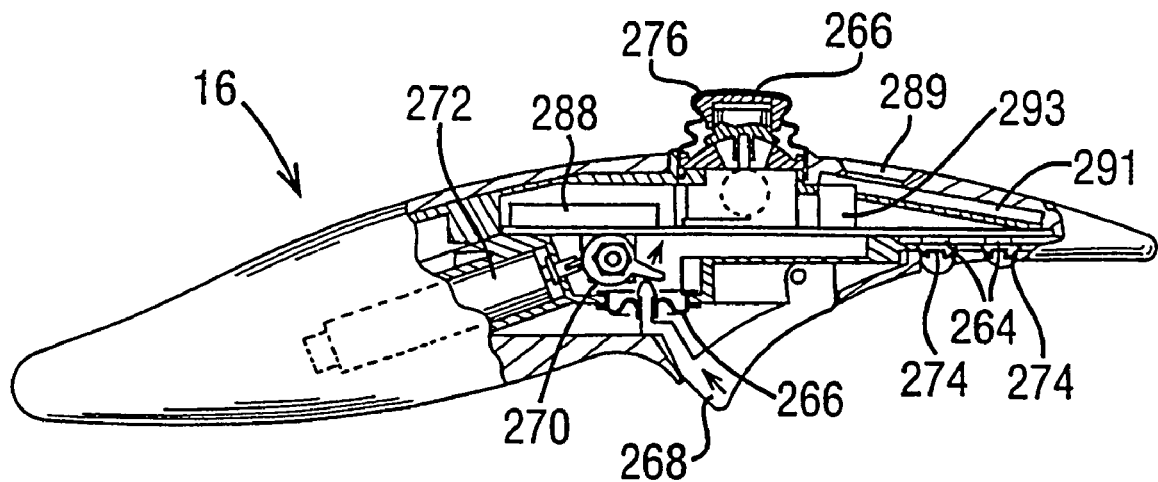
FIGS. 16A and 16B show a first handset for controlling the ROV of the present invention.
Figure 16B:
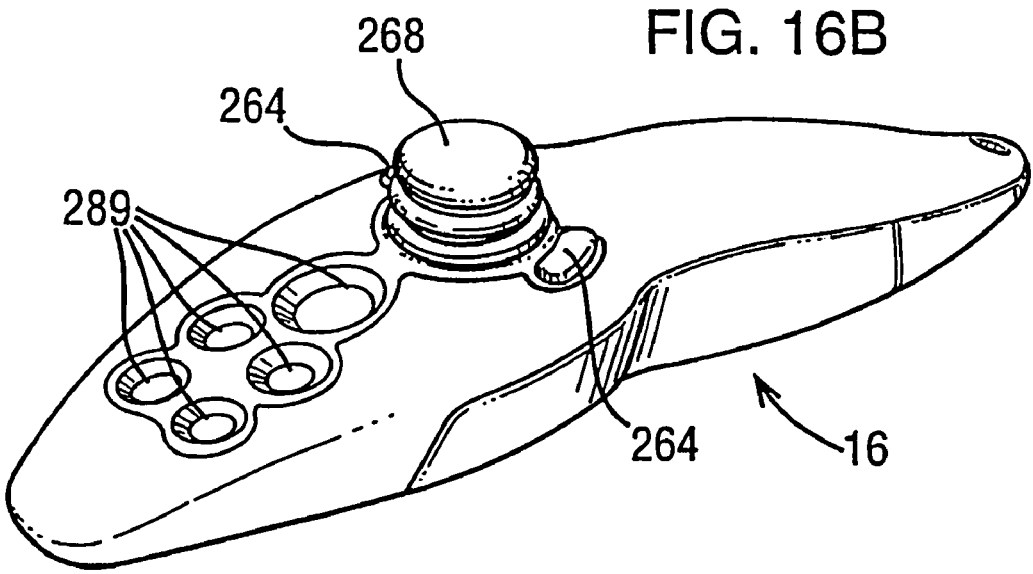
Figure 16C:
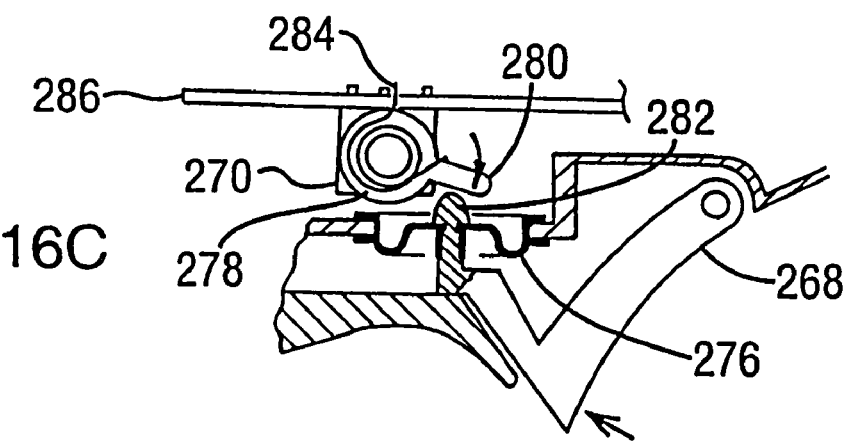
FIG. 16C shows a trigger mechanism on the handset of FIG. 16A.

FIGS. 16A, 16B and 16C show a handset 16 according to a first design comprises input means such as buttons 264 and a joystick 266 so that a user can use the handset 16 to provide instructions to the computer unit 18 for controlling the fish 10. A trigger 268 is also provided to operate a potentiometer 270. The trigger 268 acts as the throttle of the fish 10. Replaceable batteries 272 are provided in the handset 16 for power. In order to seal out splashing water, elastomer seals 274 or rubber gaiters 276 are provided for the buttons 264, the joystick 266 and the trigger 268.

The trigger mechanism, as shown in detail in FIG. 16C has a potentiometer 270 operatively linked to it. The potentiometer 270 has a sprung, pivoted lever 278 having a pawl 280 extending therefrom. A follower 282 extending into the handset 16 from the trigger 268, upon activation of the trigger 268, drives against the pawl 280 to rotate the lever against the biasing force of the spring 284. This varies the resistance of the potentiometer 270, which is connected to the PCB 286 of the handset 16 for the signal to be processed.

The trigger 268 serves to control fish linear speed in the forward direction (forward surge), while fish steering in the left and right direction (yaw) was controller by the left and right motion of the joystick 266. Pressing the button 264 arranged to the left of joystick (FIG. 16B) moves the fish in reverse (rearward surge) on a ramp speed. The ramp is implemented in software at the topside control unit 18 so that the longer the button is held down the faster the fish will move backwards in a straight line. No yaw control is implemented while reversing, rearward surge being used exclusively as a "get out of trouble" motion, not for general flying of the fish. Forward/backward actuation of the joystick 266 causes up and down motion of the fish (vertical thruster control) to dive up and down (heave).

Handset 16: Second Version

Figure 16D:
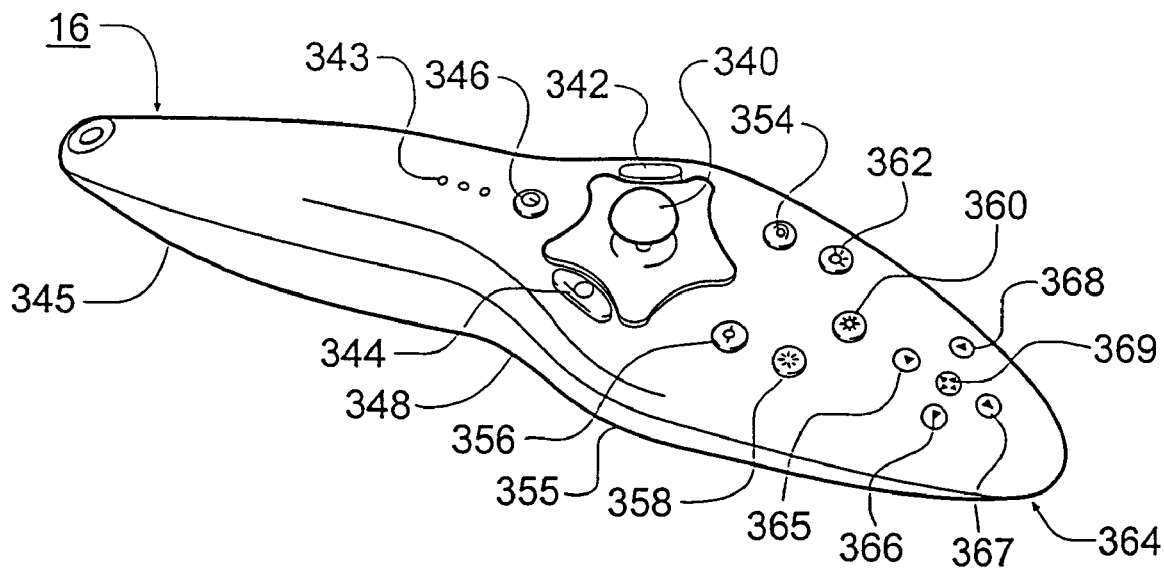
FIG. 16D is a perspective view of a second handset for controlling the ROV of the present invention.
Figure 16E:
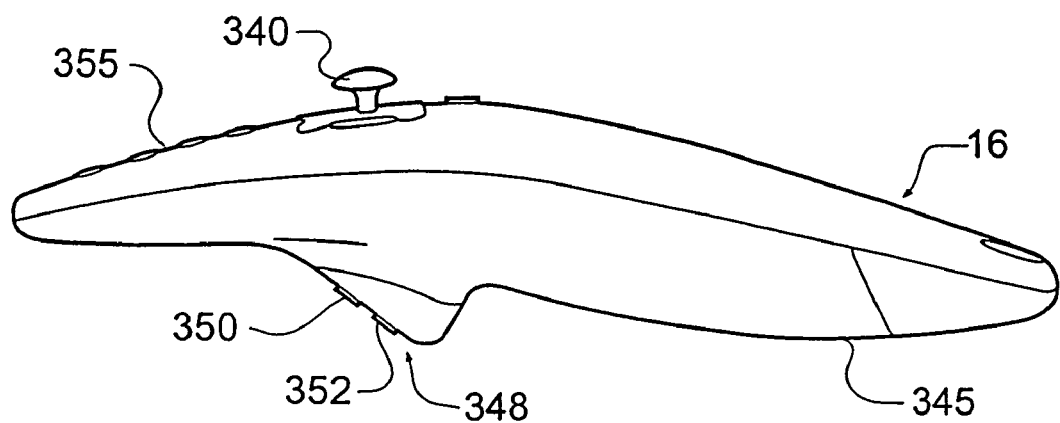
FIG. 16E is a side view of the second handset.
Figure 16F:
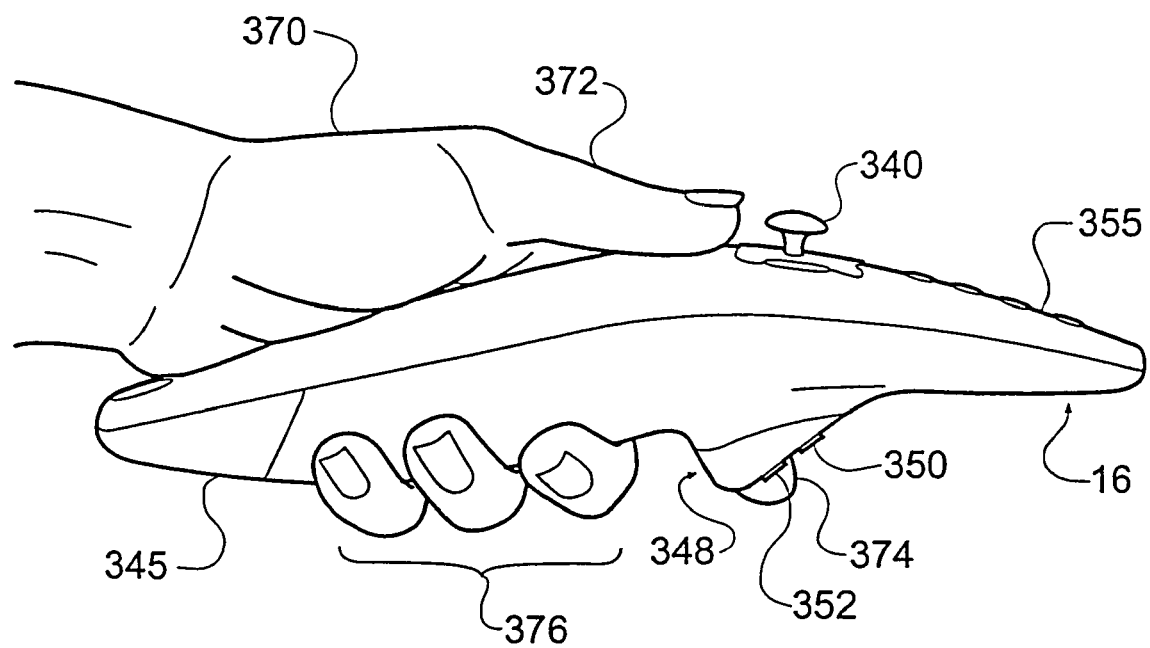
FIG. 16F is a side view of the second handset in use being gripped by the left hand of a user.

FIGS. 16D–16F show a hand controller 16 according to an alternative design. The hand controller comprises a handle portion 345 and a distal portion 355 having an upper surface visible to a user gripping the handle portion 345 between the fingers and palm of either the user's left hand or right hand. The hand controller is switched on and off with a button 346 arranged for thumb actuation. Holding down the button 346 for three seconds toggles the hand controller on or off, similar to a cell phone. An array of three light emitting diodes (LEDs) 343 immediately under the on/off button 346 are illuminated according to the charge state of the internal batteries housed inside the hand controller. If all three LEDs 343 are illuminated, this indicates to the user that the hand controller is switched on and the battery charge is full. Illumination of two LEDs indicates a medium charge state. If only one of the LEDs is illuminated, this indicates that the battery charge state is low.

FIG. 16E illustrates the hand controller 16 in side view. An upstanding analog thumb joystick 340 is evident extending from the upper surface of the hand controller. The joystick is mounted for thumb actuation by a left or right hand gripping the handle portion 345. The function of the joystick is for control of the side thrusters 36 of the fish (see FIG. 2). More particularly, the thumb joystick 340 provides control signals for controlling the surge (forward/back motion) and yaw (left and right motion) of the fish 10. The joystick is a two-axis (X–Y) potentiometer joystick. Positioned to the left and right side of the thumb joystick 340 are digital speed buttons 342 and 344 respectively which give direct control of the maximum power limit for the thrusters. The button 342 positioned to the left of the joystick reduces the maximum power applicable to the thrusters. The button 344 position to the right of the joystick 340 increases the maximum power limit applicable to the thrusters. The buttons 342 and 344 thus, for example, define a maximum linear speed of the fish (surge) when the joystick 340 is pushed furthest forward, and also define maximum angular speed of the fish (yaw) when the joystick 340 is pushed to one of its diagonal limits. This is useful for changing between sensitive low speed control (e.g. at a destination site) and high speed travel (e.g. from topside deployment area to destination site), and also for battery conservation. The maximum power limit control provided by the buttons 342 and 344 is a progressive control implemented by a time ramp in software in the topside computer unit 18. The status of the maximum power or speed settings currently set are given to the user through the monitor 20 of the topside computer unit 18. Control of the fish 10 in the vertical direction (heave) is provided by a further controller 348 positioned in a trigger position on the underside of the hand controller 16. The trigger controller 348 is mounted for index finger actuation by a left or right hand gripping the hand controller 16 by the handle portion 345. The trigger controller 348 comprises two digital buttons 350 and 352 for actuating upward and downward motion of the fish respectively. Control software on the topside computer unit 18 applies a time ramp on reception of a signal from one of the buttons 350 and 352, thus controlling the linear speed of the fish in the vertical direction. Heave control is effected through the vertical thruster 42 arranged in the vent 44 in the main body 11 of the fish 10.

FIG. 16F shows the hand controller 16 during use. The left hand 370 of a user is gripping the hand controller 16 between the middle, ring and little fingers 376 and the palm 371. The thumb 372 is stretched out resting on the upper surface of the hand controller immediately in front of the joystick 340. The user can actuate the joystick 340 without changing grip on the hand controller through movement of the thumb 372. The index finger 374 of the user is resting on the trigger controller 348 and is able to actuate either the up drive button 350 or the down drive button 352. Once again, this actuation can be performed without any change of grip of the user. The hand controller 16 thus allows control of all three degrees of freedom of the fish (surge, yaw and heave) to be performed almost intuitively with a single hand operation. Moreover, the hand controller can be used equally well with the left hand or the right hand.

Further manual controls are also incorporated in the hand controller 16, as now described with reference to FIG. 16D. A number of buttons are visible in the front portion of the upper surface of the hand controller. A group of buttons 364 is mounted towards the front nose of the hand controller. The buttons 364 provide control for the camera alignment of the camera 225 mounted in the fish behind the double-layer dome 34. The button group 364 is provided to control the pan and tilt mechanism of the body mounted camera 225, this mechanism being described further below with reference to FIGS. 12A to 12J. The button group 364 comprises a tilt-up button 367, a tilt-down button 365, a pan-left button 368 and a pan-right button 366 arranged in a star configuration with the buttons at North, South, East and West positions, as well as a pan-and-tilt center button 369 which is arranged centrally between the buttons 365–368 recessed from the surface of the pan controller. The buttons 365–368 control only the direction of movement of the camera mounting mechanism, not its speed. A constant-speed closed-loop control is implemented in the fish's control electronics. When all buttons are released, the camera holds the last position. Pressing two adjacent buttons, for example buttons 366 and 367, produces a diagonal movement of the camera. Actuation of the recessed button 369 in the middle of the four pan and tilt buttons serves to recenter the pan and tilt view of the camera 225 so that the camera is facing straight ahead with its optical axis aligned with the main body 11 of the fish.

A further group of five individual buttons is provided forward of the joystick 340 and behind the camera control button group 364. The button 362 toggles the fish lights 46 on and off. The other buttons 354, 356, 358 and 360 provide various graphics functions on the topside monitor 20.

It will be appreciated that the camera control buttons 364 and the other control buttons 354–362 are easily controlled by the thumb or index finger of the user's other hand, that is the hand of the user which is not gripping the handle portion 345.

From the above, it will be appreciated that the operation of the fish 10 can be performed in a very simple and accessible way, even to a novice user, the thruster and other controls being almost completely intuitive. This is a significant advance over normal ROV controllers for industrial use which require expert trained users.

The various control signals are transmitted to the topside computer unit 18 with a radio frequency (RF) link which is now described in more detail. As an alternative, a non-wireless communication link could be established using a cable. This alternative is not preferred.

Communications

The communications between the hand controller 16, topside computer unit 18 and fish 10 are now described in more detail with reference to FIGS. 16G and 16H.

Figure 16G:
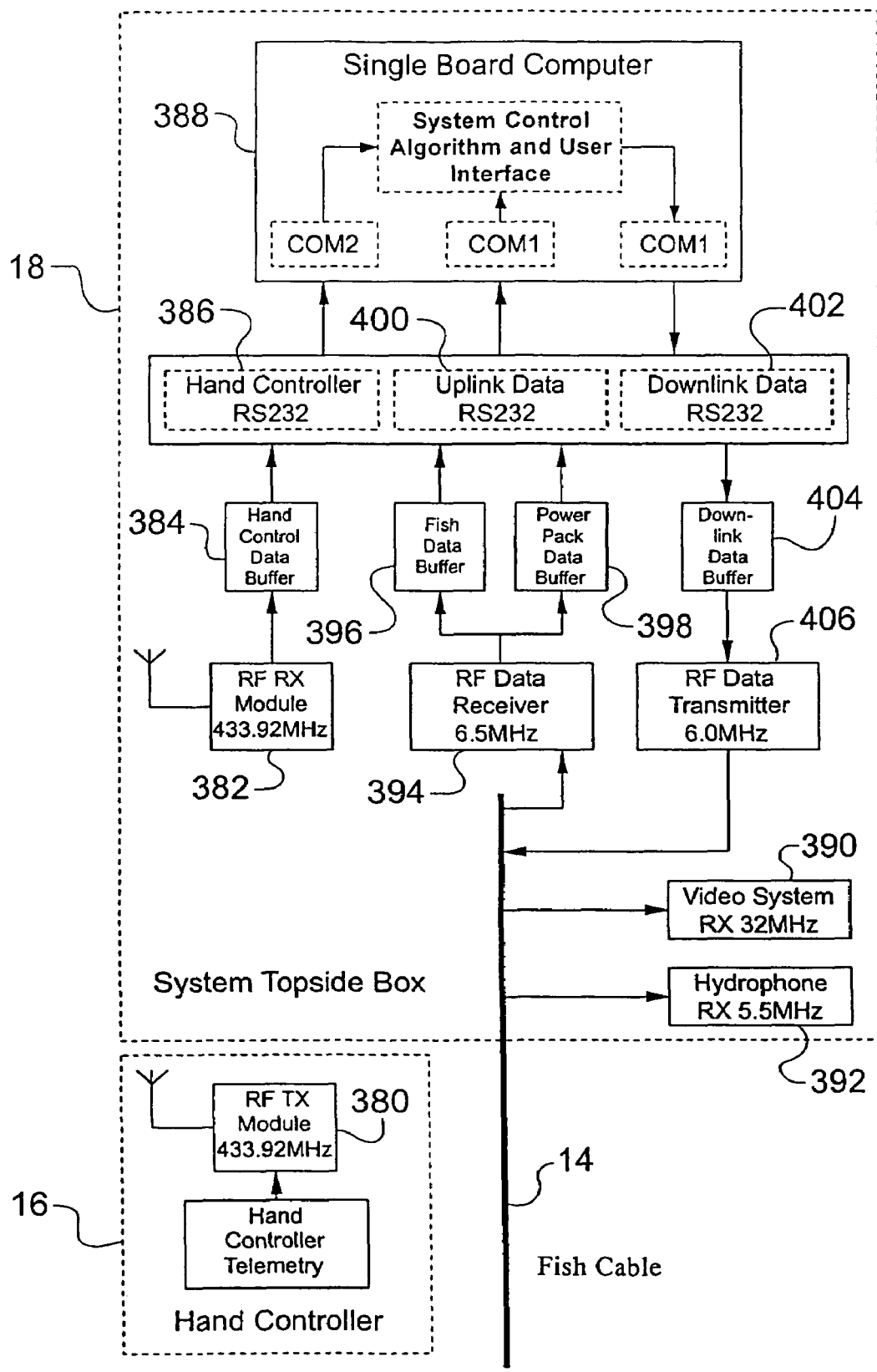
FIG. 16G is a block schematic hardware drawing of the computer unit and handset.

FIG. 16G shows block schematic hardware drawings of the hand controller 16 and the topside computer unit 18. FIG. 16H is a block schematic hardware drawing of the fish control electronics.

The hand controller uses wireless communication in air in the form of radio frequency (RF) transmissions. This is accomplished by a RF transmitter module 380, which is paired at the topside computer unit 18 by a RF receiver module 382. Both modules use a 433.92 MHz carrier. The data rate is 5 KHz, and the packet transfer rate is about 16.6 Hz (or every 60 ms). Packet length is approximately 20 ms.

When a packet is received by the topside receiver 382, it is encoded in standard RS-232 via a buffer 384 and forwarded at 9600 bauds data rate via a serial link 386 to the topside control computer 388. Packets are composed of 11 bytes of information from the hand controller and hence have a packet length of approximately 11 ms, transferred at a rate of the order of 14 Hz.

Communication from the fish 10 is performed through the umbilical cable 14. The video and audio content of the fish signals are collected by a 32 MHz video receiver 390 and a 5.5 MHz hydrophone receiver 392 respectively. The video picture from one or both of the fish cameras and the audio signal from the hydrophone are transmitted from the fish as analog FM signals on 32 MHz and 5.5 MHz carriers respectively.

Control signals from the fish are received by a 6.5 MHz RF data receiver 394 and supplied via buffers 396 and 398, and a serial link 400 to the topside control computer 388. Control signals for the fish, generated by the topside control computer responsive to the hand controller control signal inputs, are output to the cable 14 through a downlink comprising a serial link 402, data buffer 404 and 6.0 MHz RF data transmitter 406.

Figure 16H:
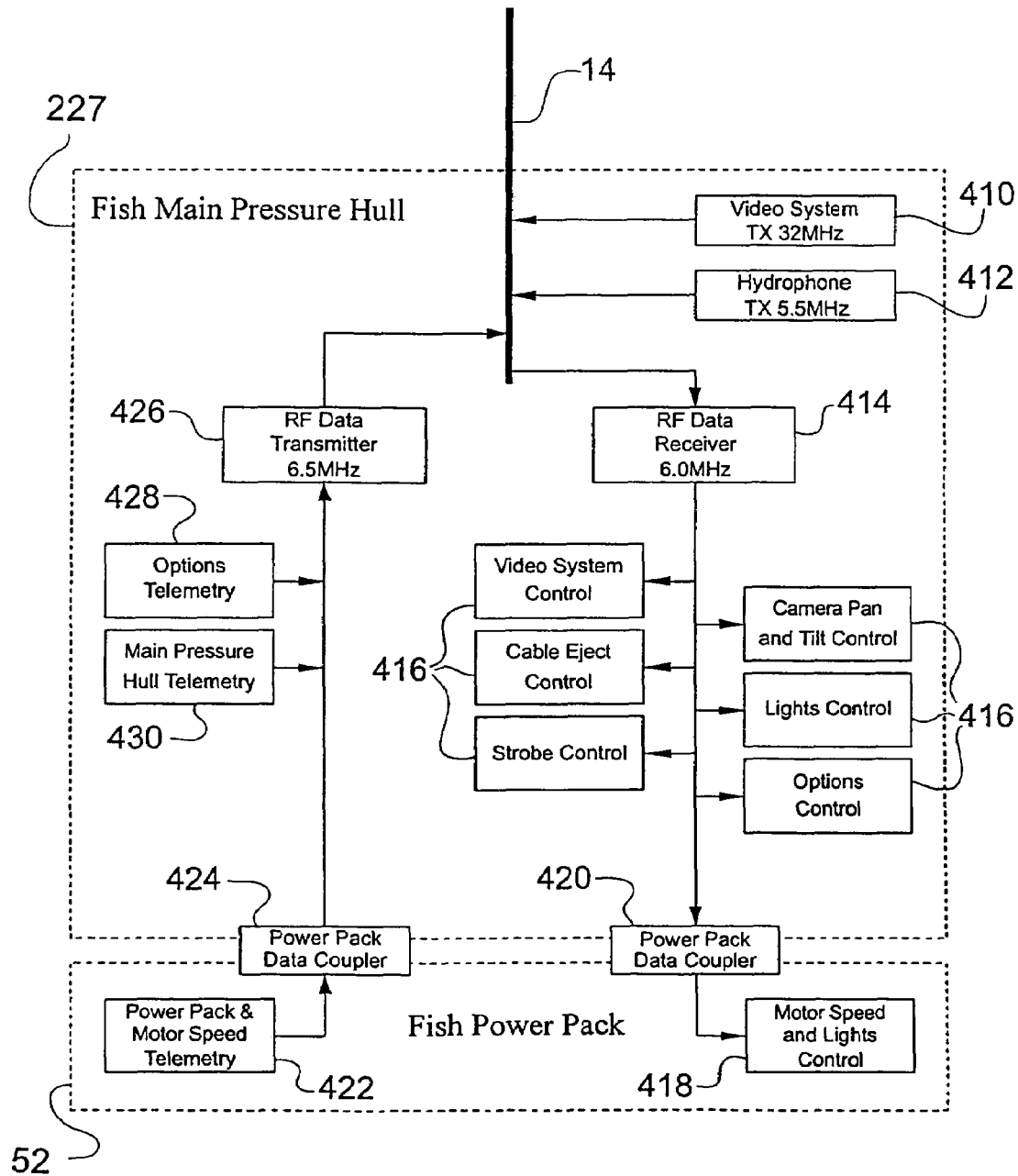
FIG. 16H is a block schematic hardware drawing of the fish control electronics.

FIG. 16H is now referred to describe the fish internal data system which is housed in the main pressure hull 227 of the fish (see FIG. 11). The control electronics in the pressure hull is powered by the batteries in the fish power pack 52 (see FIG. 8). Video and audio data from the fish hydrophone are transmitted to the topside control unit 18 through the umbilical cable 14 using a 32 MHz video system transmitter 410 and a 5.5 MHz hydrophone transmitter 412 respectively. Data received from the topside unit RF data transmitter 406 is received by a corresponding 6.0 MHz RF data receiver 414 connected to subcontrollers 416 for interpreting and outputting corresponding control signals for the video system control (e.g. camera selection), cable eject control (actuation of latch 261), periscope-mounted strobe light control, pan-and-tilt of the camera 225, control of the lights 46, and control of any option units mounted to the ROV. Motor and light control is effected through the power pack via a control unit 418 accessed from the RF data receiver 414 by a connection leading through a power pack data coupler 420. The power pack data coupler allows the 'Downlink' data stream to be transferred to the power pack with a non-contact interface. This can either be done by optical means or another stage of RF FSK modulation using carriers in the 200–400 kHz range.

Telemetry signals relating to the battery status and thruster motor status is sent from a telemetry unit 422 in the power pack through an 'Uplink' power pack data coupler 424 to a 6.5 MHz RF data transmitter 426 matched to the topside control unit RF data receiver 394. The 'Uplink' data coupler 424 is implemented similarly to the 'Downlink' data coupler 420. The power pack telemetry unit 422 sends cell voltage, power pack temperature and motor speed data. Telemetry signals from option units are supplied to the transmitter through an options telemetry unit 428. A pressure reading from a pressure sensor in the fish pressure hull 277 is also supplied to the RF data transmitter 426 from a hull telemetry unit 430. The main pressure hull telemetry comprises compass bearing, depth, temperature and immersion data. If GPS is fitted, the main pressure hull will also send longitude and latitude position data. If inertial guidance, e.g. a fiber gyroscope, is fitted, the main pressure hull will also send fish travel speed and direction information. The RF data transmitter 426 transmits to the RF data receiver 394 through the umbilical cable 14.

The fish internal data transfer is based on the 'Inbus' protocol. This protocol uses 0–5V pulse widths to indicate a '1' or '0'. A 200 us pulse indicates a '1' and a 100 us or 300 us pulse indicates a '0'. By allowing two lengths of '0', the data stream can be made to average 200 us pulses and therefore it is possible to a.c. couple the bit stream.

To transmit data the bit stream is formed into packets. The packet structure contains synchronization and address bytes and also error checking. A basic 'Inbus' packet is 11 bytes long and contains 7 bytes of data. Thus, an 'Inbus' packet length is approximately 18 ms.

In order to facilitate communication with the topside single board computer 388 all 'Inbus' data streams are converted to RS232. The data from the various 'Inbus' data streams are buffered to absorb the asynchronous nature of the various parts of the system. One central processor then collects and formats this data into RS232 data packets (also with error checking), which are sent and received from the single board control computer 388. Data to and from the fish (main pressure hull and power pack) are sent and received through COM1 and hand controller data is send to COM2. The RS232 baud rate is arbitrary and at the moment 9.6 kbaud is used.

In order to communicate with the fish 'Inbus' data is FSK modulated onto RF carriers and transmitted up and down the main fish umbilical cable 14. The various carrier frequencies are stated in the figures.

Data flow in the system can be divided in to two directions—'Downlink' and 'Uplink'. The 'Downlink' data packet contains tele-command data for control of motors, lights, cameras, pan-and-tilt, strobe light and cable eject. All data necessary for these functions is included in one 'Inbus' packet which is send repeatedly from the topside every ~20 ms. Each of the separate functions listed above listen to the same 'Downlink' data stream and extract the data, which is salient to them. It is possible to extend the capability of the 'Downlink' data stream to include more data (e.g. for control of option mounts). This can be done in two ways. Either by using the address code of the 'Inbus' packet to target data to another part of the system or by extended the number of data bytes carried by the 'Downlink' packet.

Independent of the 'Downlink' is the 'Uplink' data stream, which contains telemetry data from the battery or power pack 52 and fish 10. The 'Uplink' differs from the 'Dowlink' data stream in that a number of different 'Inbus' packets are sent consecutively. The 'Uplink' data stream is initiated by the 'Inbus' packet from the power pack. The main pressure hull electronics listens to the 'Uplink' data stream and, after the power pack packet has been sent, inserts its own telemetry 'Inbus' packet.

These two data packets repeat every ~60 ms according to the packet repetition rate of the power pack. There is room within this repetition rate to insert other telemetry 'Inbus' packets if required or to use alternative addresses to communicate data from option mounts or for power pack and pressure hull serial numbering. Each different source of 'Inbus' packet has its own address and is received in the topside by a dedicated 'Inbus' receiver buffer.

The hand controller also uses the 'Inbus' protocol. As stated above, the state of the various controls on the hand controller are measured and an 'Inbus' packet is sent every ~60 ms. This data stream is FSK modulated on to a 433.92 MHz carrier which is transmitted through free space using a standard pre-approved transmitter module. (Provision has also been made to use other types and frequencies of pre-approved transmitter modules.) The data stream is received by the corresponding receiver module, and the 'Inbus' data stream is received and buffered before being sent to the single board control computer 388.

The Fish 10

The preferred design of fish 10 is shown in FIGS. 2 to 4 and 11. The fish 10 comprises a main body 11 having a front end 22, a rear end 24, left and right sides 26,28, and top and bottom sides 30,32. The main body 11 contains a pressure vessel 227 housing a processing unit for controlling components of the fish 10.

Figure 12A:
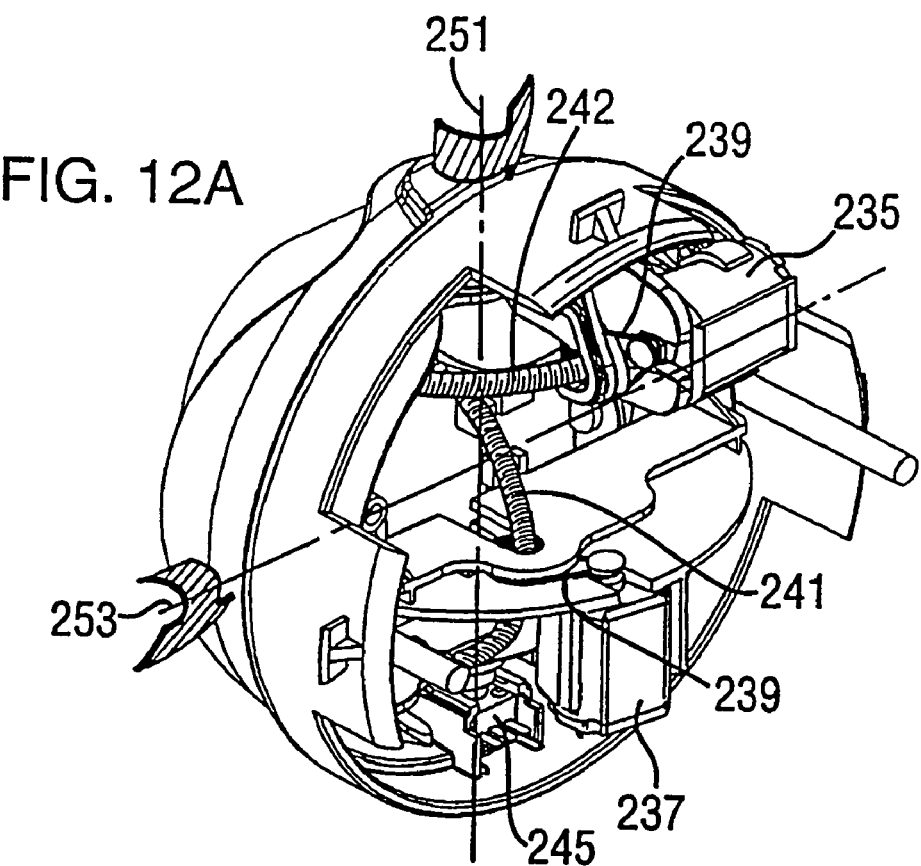
FIGS. 12A to 12J show the pan/tilt mechanism of the present invention for a camera.
Figure 12B:
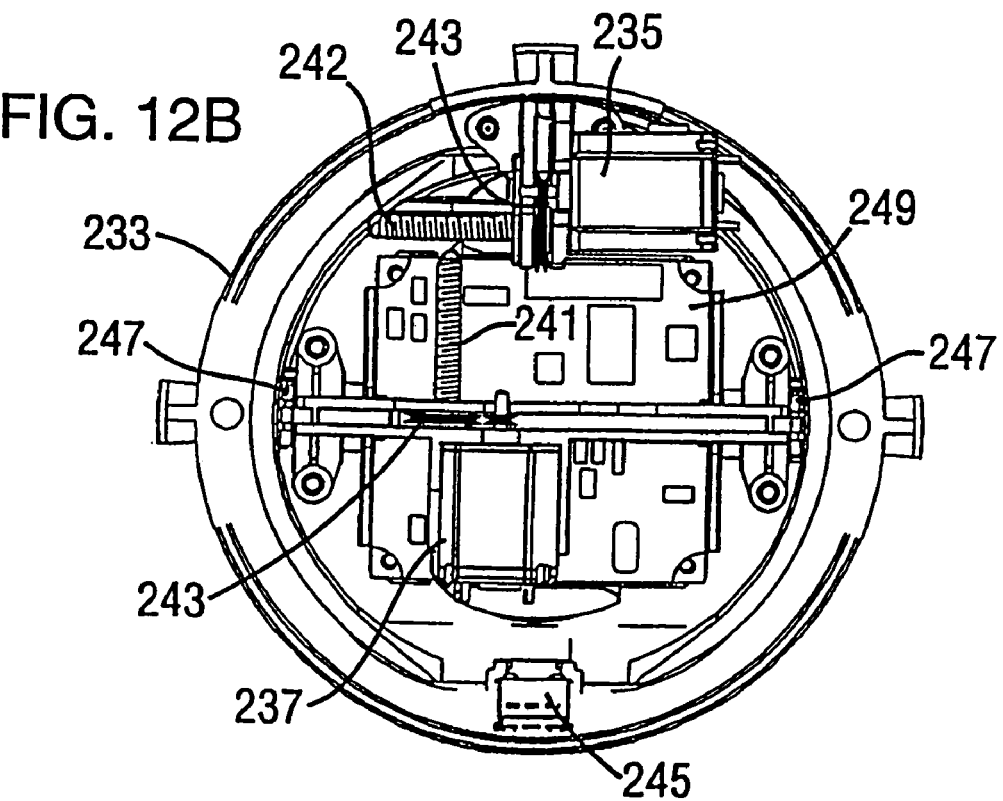
Figure 12C:
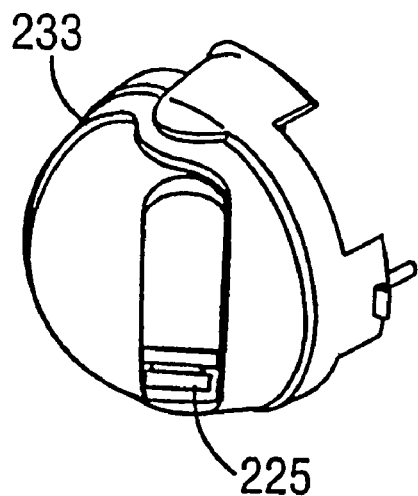
Figure 12D:
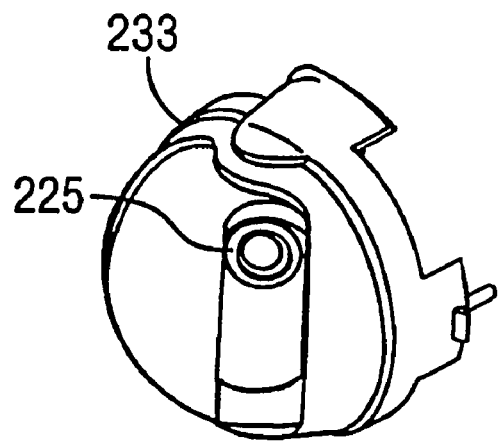
Figure 12E:
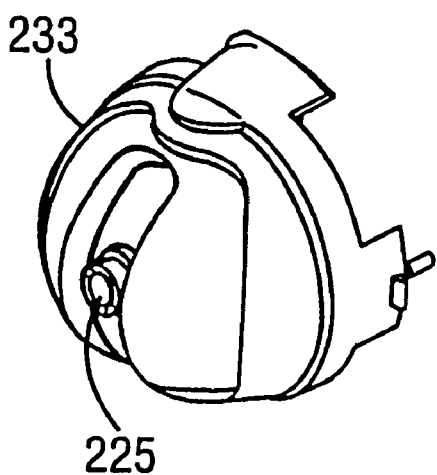
Figure 12F:
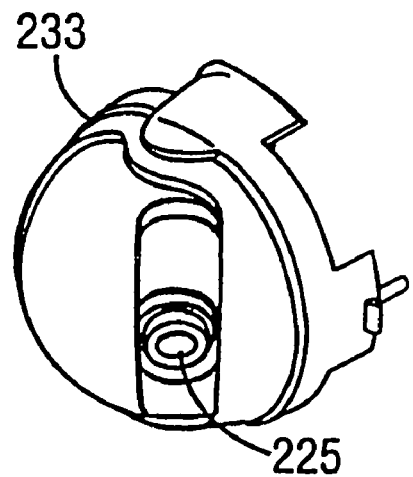
Figure 12G:
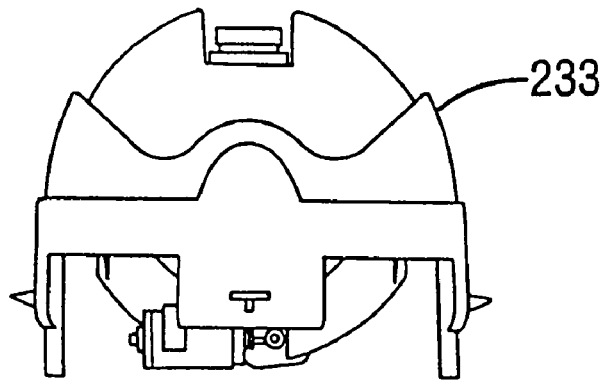
Figure 12H:
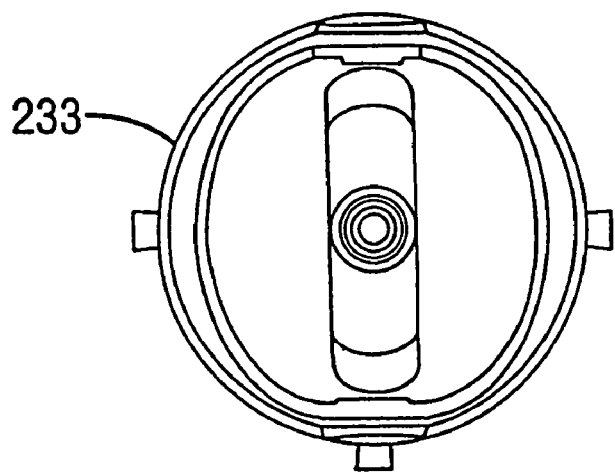
Figure 12I:
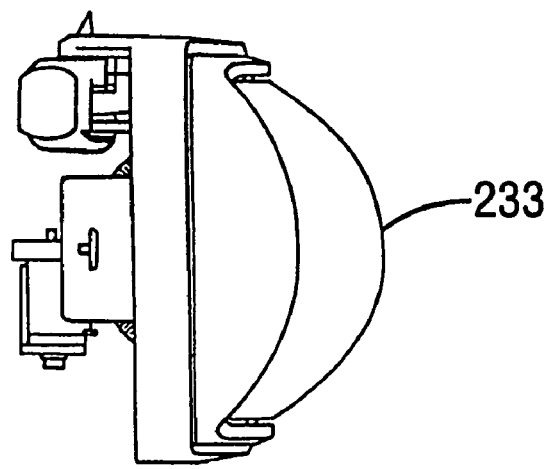
Figure 12J:
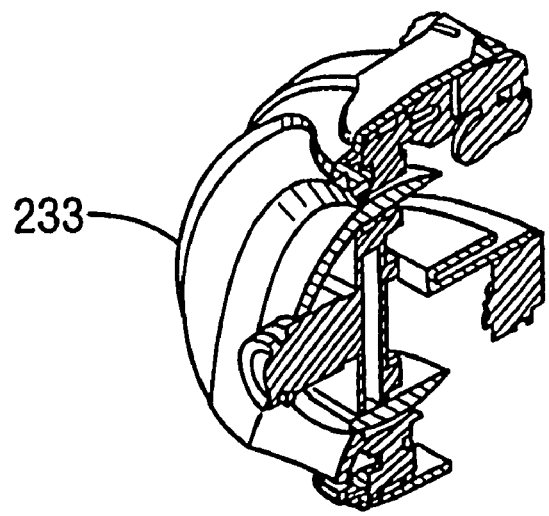

At the front end 22 there is provided a transparent dome 34 in which is mounted a video camera 225 (see FIGS. 11 to 12J). Being at the front, there is an increased risk of collision damage. However, the front provides the most convenient position to place the camera 225 since it provides the greatest unobstructed viewing circle, potentially in excess of 180 degrees.

The camera 225 is an electronic and optical device which is unlikely to be specially adapted to operate in a conducting medium, such as water, at high pressure. Therefore it is placed inside a water and pressure resistant housing 227. See FIG. 11. The housing 227 is generally made of a transparent material. The front 229 of the housing 227 will be optimized for optical properties for viewing objects in water. Preferably the front is a Perspex® or glass front dome 229 that may be removable from the housing 227 for servicing the camera 225. However, the seal between the dome 229 and the housing is high pressure watertight and semi-permanent, i.e. re-openable, comprising o-rings and a snap-fit clip means.

If the front collides with an object underwater, the front may get scratched. For an optical dome 229 this is clearly undesirable. Therefore, an additional transparent outer dome 231 is removably fitted in front of the pressure housing 227. The outer dome 231 has optical properties designed to have a negligible impact on vision underwater, and is typically thin. It also provides a profiled appearance to the front of the fish that assists in parting seaweed, or the like, from the path of the fish 10 when swimming. The outer dome 231 is a flooded dome, i.e. holes or other venting means may be provided to provide for the free passage of water around the back of it. By reason of its being totally immersed in the water on both sides thereof, firstly, the difference in refractive index of the material and that of water is such that optical distortion can be made small, and secondly it can be made thin because there is no pressure difference across its thickness. The thickness can be chosen to be that appropriate to resist impact.

If a collision occurs with an object underwater, only the outer dome 231 would be damaged and this can be readily replaced, it being inexpensive due to being a non-pressure resistant dome.

The camera will view through the two dome layers and all the images from the camera are transmitted on the cable 14 to the topside 12.

Together with the images, the sounds of the local environment can be sensed by a hydrophone (not shown). These sounds can also be conveyed to the surface by the same cable 14 that carries the video and other control or instrumentation information.

Towards the rear end 24, on both the left and right sides 26,28 of the fish 10 there are provided twin thrusters 36. The thrusters 36 are each mounted to main body 11 of the fish 10 on two arms 38,40, one of which extends substantially sideways from the rear end 24 of the main body 11, and the other of which extends outwardly and then sweeps back rearwardly from the front end 22 of the fish 10 to the center of the thruster 36. The twin thrusters 36 are independently drivable to allow forward, reverse and rotational (about a vertical axis by oppositely driving the two thrusters 36) driving force to be given to the fish 10.

The main body and swept back arms 40 are shaped so that there are no leading edges to engage with seaweed and the like in water. This allows inexperienced users to use the ROV with a reduced risk of getting the fish stuck in weed or sand.

A third thruster 42 (see FIG. 1) is provided inside the main body 11 of the fish within a vent 44 extending through the main body 11 from the top side 30 to the bottom side 32. The third thruster 42 provides a driving force to raise or lower the depth of the fish in water.

The fish 10 is preferably designed to be neutrally buoyant at a depth of 5 m. This may be achieved by adding ballast weights or buoyant portions in appropriate proportions. Some buoyancy portions may be compressible so that above 5 m the fish is positively buoyant and below 5 m the fish is negatively buoyant.

Preferably, the center of gravity should be positioned so that the fish defaults to a level orientation in water, i.e. by positioning the center of buoyancy directly above the center of gravity. This can be achieved in accordance with known principles of weight distribution in a submerged article.

Lights 46 are provided on each second arm 40 holding the side thrusters. The lights provide forward illumination to assist the front facing camera to pick up an image under water. However, if the camera is sufficiently sensitive to pick up low light images, the lights need not be used. The lights may be adjustable as described below.

A second camera is provided within a periscope portion 48 extending upwards from a rearward portion of the vent 44 on the top side 30 of the main body 11. The second camera may be a stills camera or a video camera but is preferably a monochrome video camera. It enables a view from above the water surface to be viewed when the fish 10 is at the water surface. Alternatively, it provides a second under-the-water view when the fish 10 has dived. A small front-facing window 50 is provided for the camera to view through. However, the second camera may also have a pan/tilt mechanism, and the window 50 could then be replaced with a dome to increase the angle of view. A strobe light may be fitted at the top of the periscope portion 48 for assisting in locating the fish on the water's surface.

The Power Supply

Figure 4:
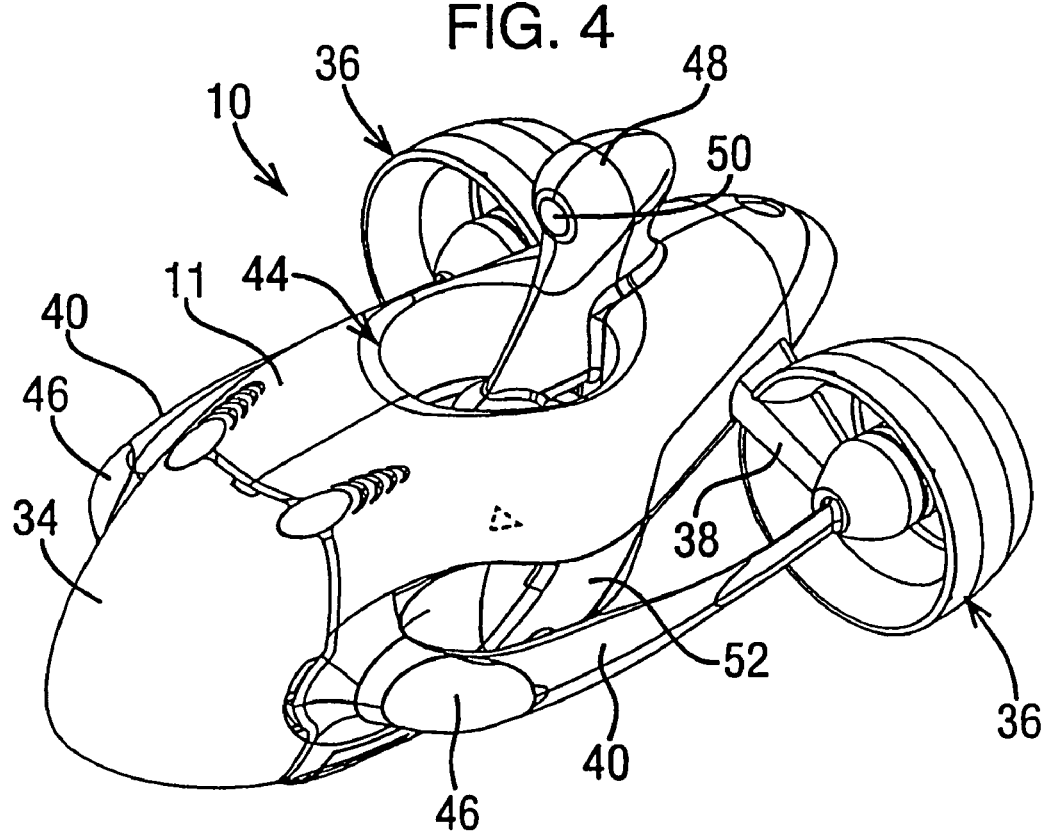
FIG. 4 is a further perspective view of a fish of the present invention.
Figure 5:
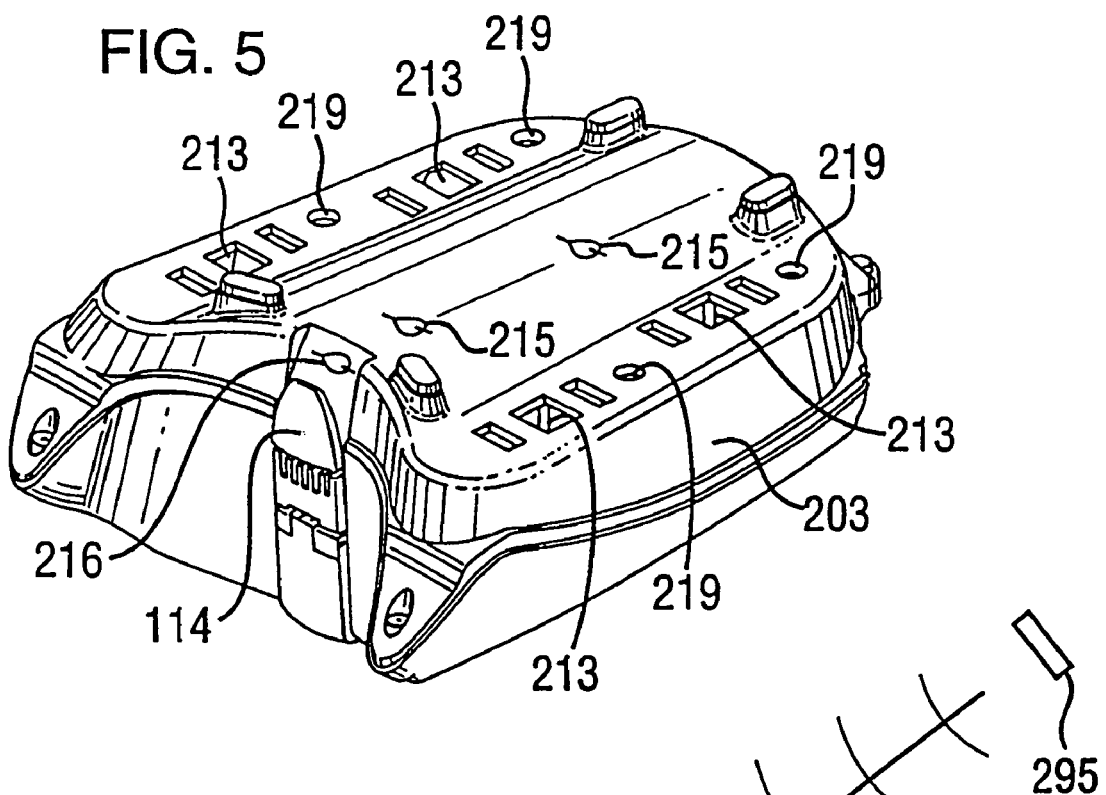
FIG. 5 shows a battery for fitting to the fish of the present invention.

Referring now to FIGS. 4, 5 and 8, the fish 10 is provided with an onboard power supply. This is in the form of a battery 52. The battery 52 fits to the bottom 32 of the main body 11 of the fish 10 and is locked in place thereon with a locking means 54 such as a lever 114 and strap 113 mechanism (see FIGS. 18A to 18E). An integrated handle may also be fitted to the battery. The handle may be part of the locking means 54 for locking the battery 52 to the fish 10, for example the strap 113.

An onboard battery 52, although preferable, is not strictly essential for every aspect of the present invention. For example, power can be fed down the umbilical cable 14 in the conventional manner, but this results in the need for a thick and heavy umbilical cable 14. However, for an ROV having a thin umbilical cable 14, e.g. one having a core of 2 mm diameter or less, in accordance with an aspect of the present invention, in order to provide sufficient propulsion power, without onboard power, it would be necessary to use very high voltages at the low currents which a thin cable would permit. However, high cable voltages are undesirable on safety grounds.

Therefore, the fish 10 of the preferred embodiment contains an onboard battery 52. In order to determine the appropriate size, type, capacity and output requirements of the battery 52, it is necessary to consider price and performance. Also, the total drag, the likely operating speeds and the likely dive duration must be considered. A typical output requirement may be 160 watts for 1 hour. One type of battery that has been found to be appropriate uses NiCd cells. The number of cells should be carefully chosen because the battery 52 will most likely be the heaviest part of the fish 10. Typically a NiCd battery 52 will have a mass of approximately 3 kg. Another appropriate type of battery 52 would be Lithium-Ion (Li-ion) which would be more lightweight.

A preferred battery 52 would comprise nine large Li-ion cells (12V).

By placing the battery 52 at the bottom of the fish, roll stabilization is achieved. Other roll control would require the consumption of power through propellers or thrusters. However, this associated with increased pitch stability.

Battery charging control circuitry may be provided on the fish 10. However, since alternative battery types can be used, different charging control is required dependant on the battery technology used. Therefore, the charging circuitry or charge management electronics should not be built into the fish 10. Preferably it should be built into the battery 52.

With the battery 52 designed to be removable from the fish 10, the operator can use several batteries before needing to recharge. Multiple batteries can then be charged overnight, for example.

The number of cells determines the battery voltage. Battery voltage is a compromise between the desire for fewer cells which is more cost effective and lighter and the desire for high voltages which reduces resistive losses for the same power and would, for example, allow more power to be transmitted along a thin cable. Preferably, the fish uses a 12V Li-ion battery, which can be transformed up to the required voltage.

Underwater electrical connectors are expensive because they have to keep out seawater at high pressure so that, for example, trapped air can insulate the electrical contacts. In the fish of the present invention, the battery supplies the fish's power distribution system. A means for connecting the power from the battery to the fish is therefore required. However, because the charge control is also inside the battery, a second connector is needed to charge the battery.

The battery may comprise two or more packs of cells, for example, for Ni—Cd cells, each pack may comprise seventeen 1.2V cells (a total of c. 40V). This allows a faulty cell pack to be identified, and the pack discarded, rather than discarding the entire battery. FIG. 8 shows a battery comprising two cells 201. The battery 52 comprises an upper shell 203 and a lower shell 205. The two shells 203,205 can be screwed together by four screws 207, one in each corner of the battery 52. A water seal 209 extends about the entire periphery of the shells 203,205. Rubber pads 211 are provided to ensure a secure seating of the battery 52 onto the fish 10. Four E-shaped induction couples are provided on the battery's upper shell 203.

Battery Lock/Handle Release Mechanism

The battery 52 must be securely fastened to the fish 10 and must never become detached under normal operating conditions.

Referring now to FIGS. 18A to 18F there is shown a preferred battery locking/handle release mechanism. It is designed to operate reliably in the demanding marine environment where corrosion and sand infiltration are but a few of the conditions that must not adversely effect the functionality of the mechanism.

To ensure its robustness, intuitive operation and minimized manufacturing costs, the underlying concept for the mechanism is one of simplicity.

The battery has a notch 112 on an end thereof. This notch 112, upon fitting the battery 52 to the fish 10, engages a flange 117 on the fish. This engagement provides a lever point about which the locking mechanism secures the battery 52 to the fish 10.

The strap 113 of the locking means 54 is fixed to the battery 52 at one end and fixed at the other end to a lever 114.

In its fitted position the strap 113 is in tension and is held tight against the battery 52 (FIG. 18A) and pulls a latch 115 over a strike 116 on the fish 10 to prevent pivoting of the battery 52 about the lever point.

Figure 18A:
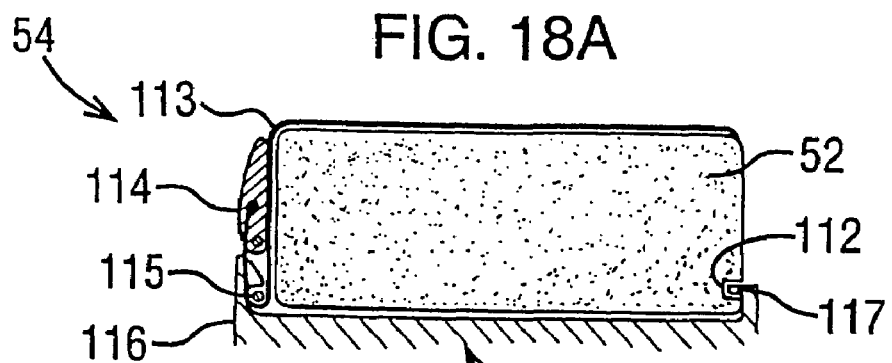
FIGS. 18A to 18F show a battery securing means.
Figure 18B:
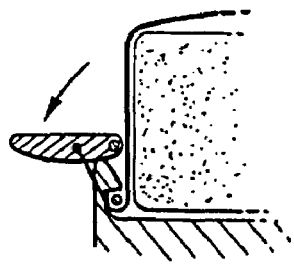
Figure 18C:
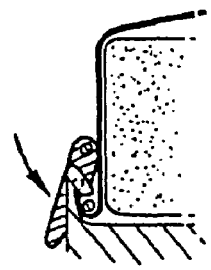

By opening the lever 114, the strap 113 is no longer in tension and is loose enough for it to be used as a carrying handle (FIG. 18B). At this point the battery 52 is still securely fastened to the fish 10 by the latch on the strike, and the flange 117 in the notch 112.

Figure 3:
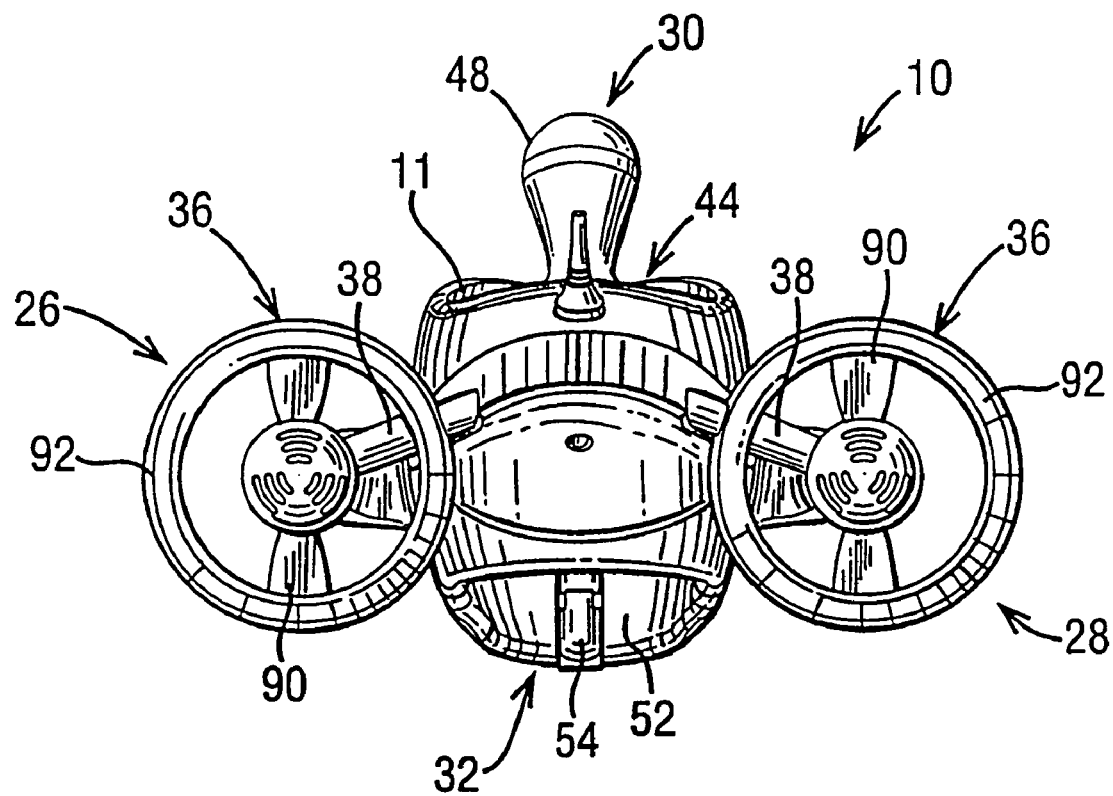
FIG. 3 is a rear plan view of the fish of FIG. 1.
Figure 18D:
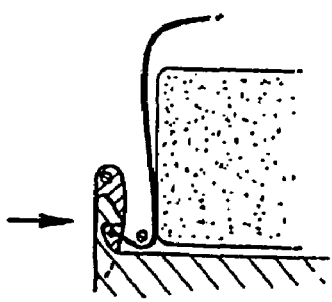
Figure 18E:
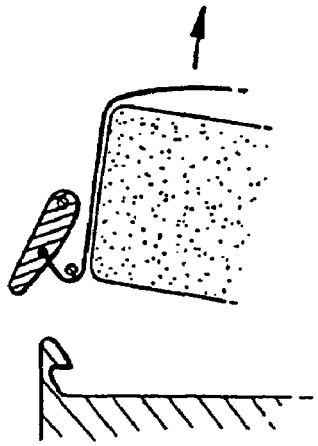
Figure 18F:
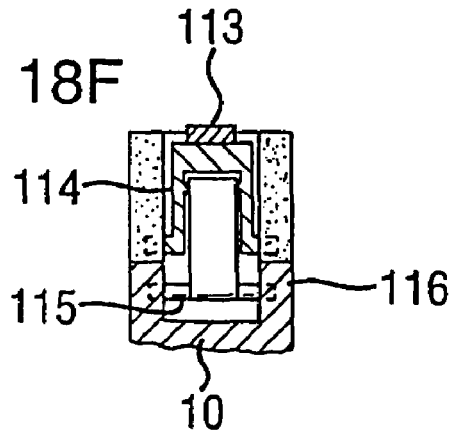

When the lever 114 is moved to a further open position (FIG. 18C), it butts up against the latch 115 (FIG. 3). Pushing the lever 114 against the latch 115 causes the latch 115 to move away from the strike 116 (FIG. 18D). The locking means 54 is now open and by pulling on the strap 113 the battery 52 may be removed from the fish 10 (FIG. 18E).

The latch 115 is sprung so that once the force on the lever 114 is removed, the latch 115 returns to its original position.

When the battery 52 is replaced into the fish 10, the latch 115 is deflected by the strike 116 and the lock automatically shuts. By closing the lever 114 the latch 115 is locked into its 'closed' position thus consolidating the locking mechanism and the strap 113 is pulled tight.

The Power Coupling

Figure 6:
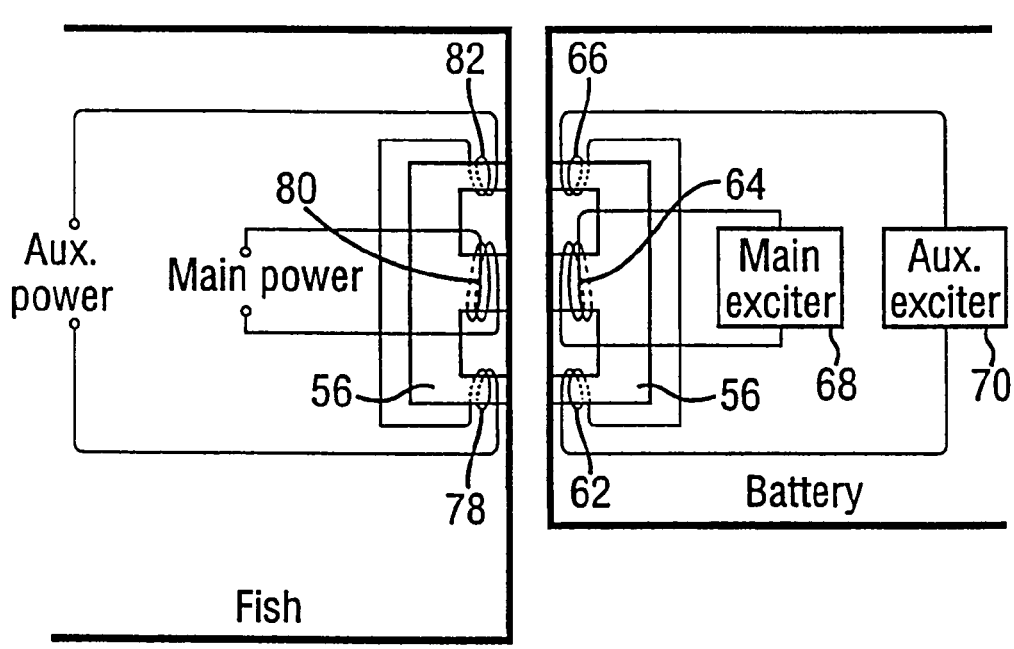
FIGS. 6 and 7 schematically show the arrangement of an induction coupling between an onboard battery and the fish.
Figure 7:
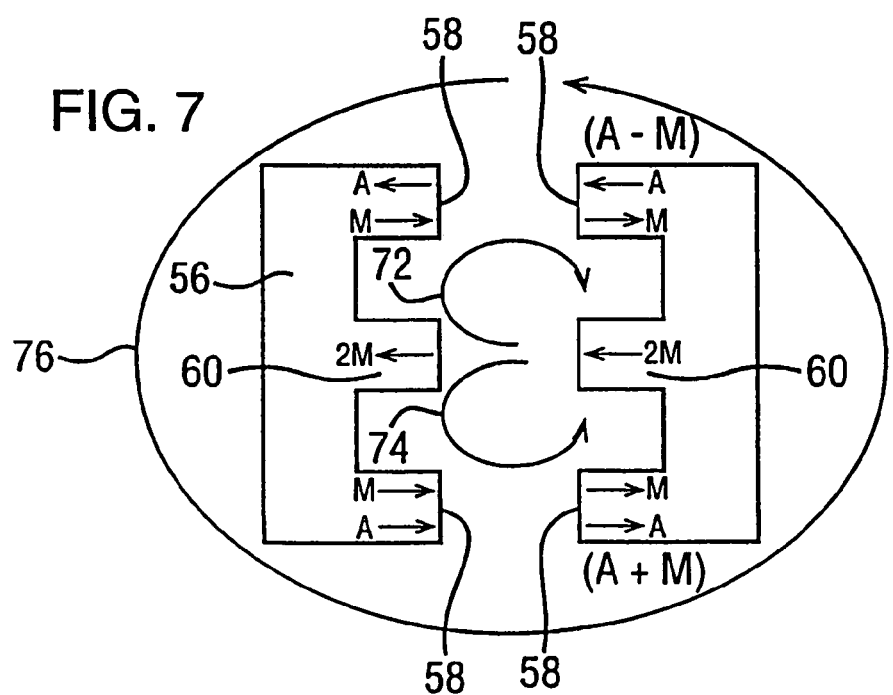

To confer the benefit to the user of being able to exchange batteries in total safety in a product dripping with seawater, the power is coupled from the battery 52 to the thrusters 36,42 inductively. The same technique is used for the lights 46 and other electronics. FIGS. 6 and 7 show induction loops suitable for this purpose. However, capacitance couplers, photo-electric couplers, or other non-electrical contact couplers such as mechanical or sonic couplers could also work. Inductive coupling has the merit, however, of small size and high efficiency.

Each battery 52 contains not only the cells, but also control means, not shown, for power couplers. As shown in FIG. 5, there are four magnetic induction points, one for each of the three thrusters and one of which is shared between the lamps and the control and video electronics.

The sharing arrangement, which is also used for auxiliary power to the commutators of the thrusters 36,42, will now be described with reference to FIGS. 6 and 7.

Each induction coupler for transferring power from the battery 52 to the fish 10 comprises two E shaped cores 56, one in the battery 52 and one in the main body 11 of the fish 10. The limbs 58,60 of the two opposed E shaped cores 56 align with each other. The control means, when the battery is powered up, see below, selectively applies an appropriate AC voltage to coils 62,64,66 provided around the limbs 58,60 of the E shaped core in the battery 52 in response to control instructions received from the onboard processor(s).

The AC voltage is driven by a main exciter 68 or an auxiliary exciter 70. The main exciter 68 applies the voltage to the coil 64 around the central limb 60 and the auxiliary exciter 70 applies the voltage to two rotationally opposed coils 62,66 on the two outer limbs 58. As shown in FIG. 7, this sets up three flux loops 72,74,76 in the E shaped coil.

The flux densities and directions at an instant are quantified in FIG. 7 by constants A and M (for Auxiliary and Main flux densities). By virtue of the opposed windings in the coils 62,66 driven by the auxiliary exciter 70, the effect of the flux loops 72,74 from the coil 64 on the center limb 60 gets cancelled out. Therefore, the main power and the auxiliary power transferred across to the fish 10 by induction via the flux loops 72,74,76 are independent of each other:

The two coils 78,82 on the outer limbs 58 add the flux and this cancels out the effects of flux M: (A−M)+(A+M) =2A;

The coil 80 on the central limb 60 is wholly excluded from the effects of the auxiliary flux loop 76.

The limit to the total flux is set by the amount in phase in one of the side limbs=M/2+A, which must not exceed the saturation flux density of the core material.

Induction coupling is a sufficiently sensitive, efficient and accurate means for transferring current across an insulator for not only enabling power to be transferred, but also control instructions to be communicated between the fish and the battery, or the fish and the cable.

The Power Control

In the preferred embodiment, most, if not all the power for the fish 10 is provided by the onboard battery 52. As previously described, this is a 12V battery. However, other voltages may also be required for ancillary components.

The control of each light 46 is carefully organized so that the inrush current is minimized by progressively increasing the power to 100% over a two-second period. By this means, the inrush is within the capability of the converter and at the same time this significantly prolongs the life of the bulbs. When no lights are required, the converter is shut down. In addition, the lamp power generator is short-circuit protected so as to withstand a possible short-circuit which may occur when a lamp fails.

Processor Power Up/Power Down Sequences

Live induction loops can be a hazard due to the heat that can be generated by them by induced eddy currents in a conducting object. Therefore, to make sure that the battery 52 does not generate strong magnetic fields when not attached to the fish 10, safety interlocks are provided to switch off the induction couples 213 and the battery's processors until the battery is correctly fitted. A power-up sequence for the battery's processors is also provided to ensure correct initiation upon fitting the battery 52 to the fish 10, or the battery charger (not shown). This is since a different battery processor setup is required for the fish and the charger. Also a sequence for powering down the battery 52, without removing it from the fish 10, is desirable, but in any case the battery pack's own processors will shut it down immediately an attempt to remove it is detected by means of a broken interlock.

Referring to FIG. 5, three safety interlocks 215, 216 are shown. They are all positioned on the upper shell 203 of the battery 52. The first two are on the fish-facing surface 217 of the shell 203. The third 216 faces the lever 114 of the locking means 54. They are each preferably magnetic reed switches so that they can operate in a completely non-contact manner. Other interlock means could include electromagnets, optical means or switches through the case, or wired through the box or via RF or electrostatic communication means. Any such interlock needs to indicate its state to the battery 52 so that the battery 52 can decide whether to operate its power transmission circuits. Any such means can be spatially placed on the battery in such a way that the probability of the interlocks being accidentally operated is very low.

For the magnetic reed switch interlocks, appropriately positioned magnets are positioned on the fish 10, the lever 114 and the battery charger to operate the magnetic reed switches in an appropriate manner, as described below:

The third interlock is an on/off switch. When the lever is positioned adjacent the interlock, i.e. into a closed position as shown in FIG. 18A, a magnet in the lever 114 operates the reed switch into an "on" state. When the lever 114 is moved into the position shown in FIG. 18B, the reed switch is returned to its default "off" state.

The two interlocks 215 on the fish facing surface 217 of the upper shell 203 enable the battery to determine the fitment state of the battery 52, i.e. whether it is in a fish 10, in a charging unit or in neither. When the third interlock is in an "on" state and only one of the other two interlocks is "on", the processor in the battery 52 indicates to the battery 52 that the battery 52 is in a charging unit. Therefore the charging unit must only have one corresponding magnet. If all the interlocks 215,216 are "on" then the processor indicates to the battery 52 that it is in a fish 10. If neither one of the two interlocks 215 in the fish facing surface 217 of the upper shell 203 is on, then the processor indicates that the battery 52 is to be kept switched off since it is in neither a charging unit or a fish 10.

A processor in the battery is permanently connected to the cells of the battery and it intermittently checks the interlocks 215,216 for their state. The test of the battery's circuits can then be powered up when the appropriate return signals are obtained from the interlocks 215,216, i.e. power off mode, battery charging mode or fish power mode.

Additional data receiving nodes 219 can also be provided on the battery 52 that do not require the power or size of the four induction power couples 213. These can be permanently running to allow data communications to and from a powered down battery 52.

The additional data receiving nodes 219 can be used, for example, as an additional safety check for the charging cycle. In the charging mode, a battery 52 or the processors therein could easily be damaged by short circuiting of the induction couplers, for example. Therefore before entering the charging mode, the processors could require a specific data stream signal to be sent by the charging unit through the additional data nodes 219. The data nodes 219 can also operate using inductive coupling or even capacitance coupling.

The data node 219 on the battery 52 comprises a hollow ferrite core having a coil winding about it connected to the processor circuitry. A corresponding node can align with the core to enable the inductive coupling therebetween. By making the core hollow, its weight can be reduced. However, by virtue of the larger diameter of the core, an increased inductive capacity is provided. The node can therefore be used for a limited amount of power transfer. However, its power transfer efficiency is reduced compared to the E-shaped cores. Nevertheless, for data transfer, it does not require efficiency.

A power up and power down sequence will also be used to allow the fish to conserve its battery power when not required. This can be done in such a way that the user does not need to remember to switch the fish on and off, for example by a timed inactivity switch—if a manual on/off switch was instead provided on the fish 10, the switch would have to work through the fish's bulkhead, which is a pressure chamber. The addition of such a switch is undesirable. A sleep mode can also be provided for the battery 52. A switch on the topside 12 can activate this. Sleep mode would allow the fish 10 to be maintained at a fixed position underwater (in still water) for a prolonged period without it entering its recovery mode or draining its power supply.

The fish's power is preferably shut down to a current drain of only approximately 200 μA, i.e. that required for maintaining power to a processor for sensing a power-up command from the topside. This is considerably less than the self discharge of the main batteries (approximately 1% per day for nickel technologies or under 0.1% per day for Li-ion).

Power on the fish 10 will be turned off in various situations:

A first situation is when the user decides to shut down the system by operating a switch on the topside 12.

A second situation is either where the umbilical cable 14 is broken or where a command has been sent for detaching the umbilical cable 14 from the fish 10.

A third situation is when the battery 52 is removed from the fish 10.

An additional feature of the system could include a recovery mode. If the onboard communication processor senses that communication with the surface is no longer possible, and that no shutdown command has been received, the fish's processor would adopt a recovery procedure. This is likely to be of the nature of a controlled ascent to the water's surface. Sensors can be connected to the processor so that the processor can control the fish 10 autonomously in a straight up ascent and then shut the power down at the water's surface. It would preferably then also switch on at least one of the lights 46, or a strobe light so as to draw attention to the fish's position when it gets to the surface. For example, the housing may have transparent portions behind which a strobe light could be fitted.

Communications Between the Fish 10 and the Topside 12

The umbilical cable 14 is the means for transmitting video images from the fish 10 to the topside 12. It is also the physical medium by which the fish 10 can be commanded by the topside 12, and by which the fish 10 can send to the topside 12 information concerning its status.

A connector 257 connects the cable 14 to the fish 10. At the center of this connector 257, a non-contact data coupler is provided. Preferably this coupler is an inductive coupler.

Since the data coupler is not required to transfer power to the fish, it does not need to be efficient. It is merely required to transfer the data information across the connection. Therefore, for an inductive couple, the magnetic core need not form a complete loop for the flux to pass around. There just needs to be a flux link across the gap between the fish and the cable. Further, in view of the high speed link required between the cable and the fish, a large inductance would be undesirable. The preferred coupler therefore comprises a pair of ferrite core rods of approximately 3 mm diameter, each having a coil winding wrapped around it. These cores are encased in a plastic so that they are not in contact with the water, and in use the two cores are axially aligned to define the flux path across the gap.

The information transmitted includes the video stream from the camera, the fish's water speed, heading, depth and attitude, and other positional information and the like.

The fish's water speed can be determined by a rotating impeller containing a magnet which changes the state of a sensor such as a Hall-effect device or a read switch. This signal would be connected directly to the communications processor, which measures the interval between pulses and incorporates the value in a message to the surface.

A fluxgate compass can be used to measure the angle of the earth's magnetic field in the horizontal plane relative to the heading of the fish 10. A fluxgate device has been selected to be gimballed within the range of ±40° to the horizontal. The coils of the compass are driven directly by a processor and an A–D is used to measure the fluxgate output. Its values are transmitted directly to the surface to avoid having to calculate the angle within the fish.

A pressure transducer can be mounted in the body of the fish 10 for sensing the water pressure, for example through a hole in the wall of the housing. Its signal is amplified and fed to an A-D attached to one of the fish's computers. The value obtained is sent to the surface.

The fish's computer system contains a non-volatile storage medium which is used for calibration data such as pressure span, fluxgate span and the correction parameters which can vary from one fish to another, and security data such as serial numbers.

The attitude of the fish 10 can be determined using a transducer:

A tube is filled with a magnetic liquid. A coil reduces flux in the liquid but its relative position, due to its attitude, determines how much is coupled to two other sense coils. The difference in the signal is a direct measure of attitude.

Options

There may be devices and mechanisms (options) which the user would wish to attach to the ROV. The user would wish to be able to operate them or get data from them by communications means along the umbilical cable. Therefore the option would require physical attachment, electrical/communication control means and power. Such communications must coexist with, and not interfere with nor be interfered by, the existing communications. Similarly, third party devices should be prevented from accessing the software that governs the operation of the ROV.

Figure 9:
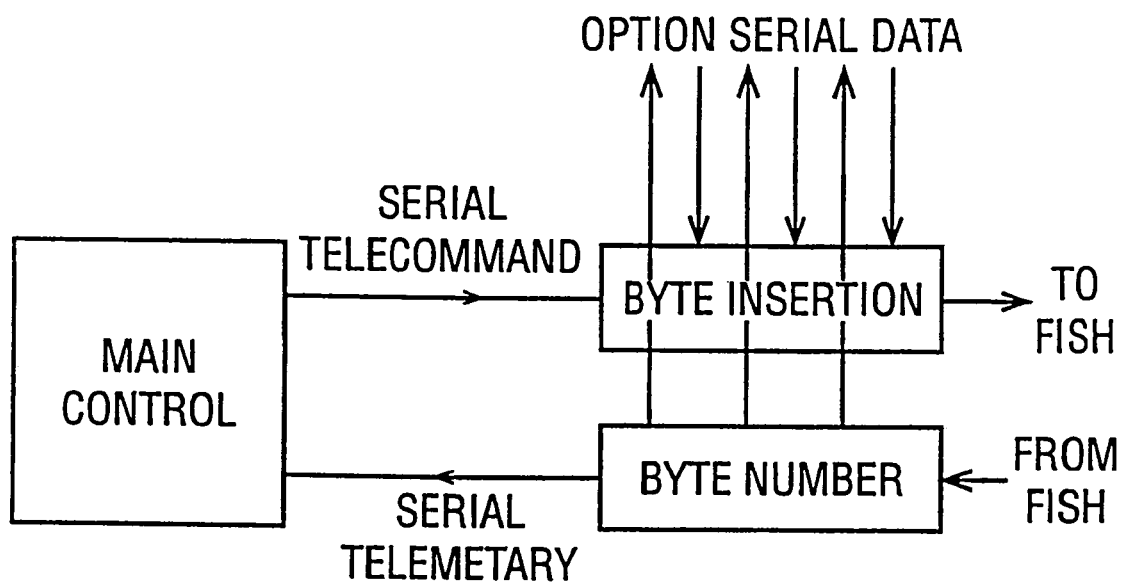
FIG. 9 schematically shows the option control implementation arrangement for the ROV of the present invention.

The ROV of the present invention, either in the fish 10 or the battery 52 can therefore be provided with a separate processor for controlling the option or a separate subsystem which enjoys some cable bandwidth, either by FDM or TDM, but which can be easily employed by third parties. The subsystem is called the Options Subsystem (OS), see FIG. 9, and it provides one or more serial channels (three in the implementation of FIG. 9) with a fixed data rate (e.g. 300 b/s). The topside access is by conventional RS232 type serial interface. However, the option, if connected to the fish end, e.g. an additional camera such as a stills camera, must be mechanically and communicatively connected in a way which is both connectable and disconnectable, and which is not affected by high pressure sea water. For example, non-contact power/data communication couplers, using resonant circuits, and brackets could be provided at certain places around the fish 10 or on the base of the battery 52 together for both the power/communications and physical attachment of the option to the fish 10. By fitting options underneath or low on the fish 10 or battery 52, it should be possible to avoid affecting the fish's stability.

Inductive or capacitance coupling points, such as those used in the data nodes on the battery 52 or the data coupler in the cable connector, will achieve the desired communication connection. Alternatively, the processor or subsystem can communicate with the option via a fiber optic means, for example one low cost large diameter fiber for transmit and another for receive. The advantage of these approaches is that there is no electrical connection between the option and the fish 10 or battery 52. The magnetic couplers can also be used to send some power to the options so it may not require its own power source. For example, water salinity measurement devices, water temperature measurement devices and the like, can operate off a very low power supply. Therefore, power could be provided from a non-contact data coupler (low power capacity). However, for more power hungry options such as grabber arms, a more powerful non-contact coupler could instead be provided, or the option could have its own power source, i.e. battery.

Adjacent to the non-contact couplers there will be provided mechanical fixing means so that the couplers on the third party device (the option) can be attached easily by the user. It is envisaged that the option will be supplied in two parts—a wet part and a dry part. The wet part is the option itself and is attached to the fish 10 and its communication coupler fixed to the correct part of the skin of the fish 10. The dry part is plugged into a corresponding connector on the topside equipment.

In the preferred embodiment, the topside 12 has a microcontroller which takes the serial data stream from the topside control system and inserts bytes of serial data obtained from the option's RS232 port. This is by TDM with the telecommand signals. A similar device is inserted in the serial data stream received from the fish 10 so as to recover the options information and pass it to the appropriate RS232 ports. Similar devices in the fish 10 itself separate both transmitted and received options data from the telemetry and telecommand streams. Other methods could include a separate frequency band i.e. by FDM on the umbilical cable 14.

The need for high pressure water proof connectors or induction coupling points for providing power to the option can be avoided by making the option self powered, i.e. it has its own battery.

By transmitting all option control communications via the non-contact communication means described above, through the communications processor and up the umbilical cable 14 to the topside computer unit 18, there is no need to update the software on the fish 10 when an option is installed.

The Umbilical Cable 14

The cable 14, in use, will be unwound to a great length, for example 200 m. With large diameter umbilical cables, such a long length will mean that there is a substantial surface area that has to be dragged through the water by the fish 10. Therefore, in accordance with the present invention, the cable 14 comprises an outer skin 86 and a bi-wire core. By arranging the two wires in a coaxial manner, the high frequency performance of the cable 14 is enhanced which extends the opportunity for FDM within any given cable diameter. Thus by careful selection of the FDM and TDM and the bandwidth requirements, the diameter of the cable 14 can be reduced in a manner consistent with the desired maximum length so as greatly reduce the size, weight and cost of the cable.

Figure 10:
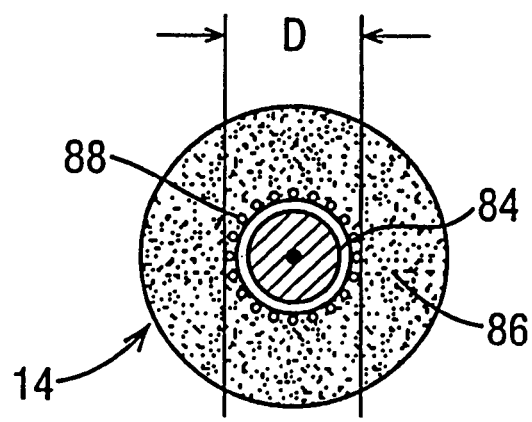
FIG. 10 is a cross-section through an umbilical cable of the present invention.

A preferred construction of the umbilical cable 14 of the present invention is shown, in section, in FIG. 10. In the preferred coaxial cable, the core 84 has a diameter D of less than 2 mm, preferably 1.2 mm. This very thin light-weight umbilical cable 14 contains very little copper. Therefore, it is easy to make float by making the outer skin 86 of a buoyant material.

The core may be a fiber-optic cable; it must be capable of transmission of television signals, and control signals, preferably with full duplexing. However, the advantage of the coaxial cable is that it may be cheaper to obtain and cheaper to interface for bi-directional transmission of control signals. Further, a coaxial cable may carry some charging current.

To maximize the power, all the area of the copper must be used for power. By modulating the signals, e.g. by frequency division multiplexing, all telemetry and video, as well as power, can be carried on just 2 conductors.

The cable could be eliminated entirely by modulating an ultrasonic beam. However, even by using sophisticated compression technologies, this would still require an unacceptably high power to achieve, and still would result in relatively low quality video transmission.

Another advantage of having the cable 14 of a small diameter and weight is that even long lengths are easily manageable by a single person.

Small diameter cables have a low tensile strength. Therefore, surrounding the cable will be linear fibers 88 of Dynema® or Kevlar® to give the cable mechanical tensile strength. This may then be held together by a hairy polypropylene braid which provides color and can be used to hold distributed floats or weights on the cable in place (see below). Further, the hairy braid may reduce hydraulic resistance on the cable in the water.

Cable strumming is where the cable vibrates due to its movement through the water. This presents to the water an increased drag. By placing minute weights or floats at irregular intervals along the length of the cable, or by using a hairy braid on the outer surface of the cable, the strumming effect is reduced.

Another problem associated with the cable is how it affects the maneuverability of the fish 10. Attaching the cable 14 at the top of the fish 10 in the center of rotation thereof, the fish 10 can turn by pivoting around the cable attachment point.

The cable 14 can have floats attached to it close to the point of attachment to the fish 10. These floats lift the cable 14 clear of the fish 10. To counteract the lift this causes to the fish, 2 m further down the cable 14 there can be provided weights on the cable 14 so that it falls back towards the seabed. Then, after another 2 m it can be floated all the way to the surface by the buoyant skin material.

The weights in the cable 14 will cause a part of the cable 14 to be at an increased risk of touching the seabed. It can therefore be thickened or reinforced along a limited length local to the fish 10 so as to prevent damage occurring from abrasion, without substantially increasing the drag of the whole length of the cable 14.

A copper cable suitable for use in the present invention can be fabricated in a number of ways. These include:

1) laminating copper strips on each side of a thin plastic substrate and then, by heat or other means, fusing a plastics material either side of the copper so as to completely insulate the copper on both sides thereof. This insulates the copper strips from each other and from the sea water. Because the application is for a leisure vehicle it is anticipated that only low voltages will be applied between the conductors so that any insulation involved can be of minimum thickness.
2) electro-depositing copper on to thin substrates. These can then be removed with the insulation being applied by printing or spraying.
3) extruding insulation around round conductors, such conductors being stranded for best flexibility and organized coaxially for best RF transmission.

The overall size of the cable can be made small, to provide ease of handling of the cable, and to reduce its total weight. The cable preferably has an outside diameter of between 2–10 mm, more preferably less than 7, 8, or 9 mm, and greater than 2, 3 or 4 mm. In this way, the cable can be made sufficiently structurally rugged to prevent it being broken if subjected to tensile stress during use, while at the same time being relatively light. In an embodiment of the invention, a 200 m spool of cable has a total weight of less than 10 kg.

Cable Connection

The umbilical cable is terminated at both ends both electrically and mechanically. At the fish end, the cable 14 is terminated in a special connector which has high mechanical strength. Care is taken in the design to ensure that minimal strain is applied to the copper. An electromechanical means is provided to release this connector if the onboard computer generated a disconnection instruction.

As describes above, the electrical part of the cable is connected to the fish using an inductive coupler, i.e. a two part passive resonant transformer winding, half of which is in the end of the cable and the other half of which is wired in the fish just under the surface of the pressure housing.

The strain element of the cable connection uses a bayonet mechanism 257 that transfers any cable tension directly to the chassis of the fish 10. The mechanism 257 can be operated by means of an electrical signal so as to release the end of the cable 14 from the fish, if the need arises. This can be achieved using a shape-memory-alloy actuator, which is heated so as to contract, thereby releasing the connector.

Figure 19A:
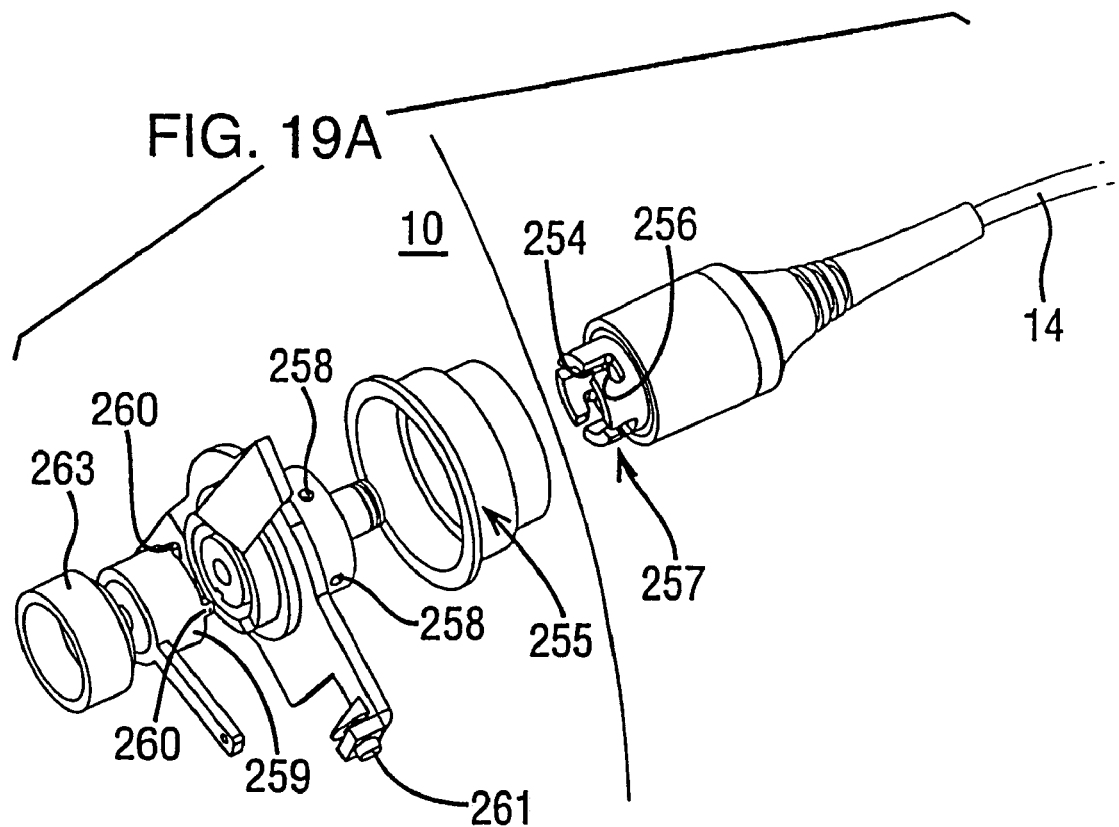
FIGS. 19A and B show a cable release mechanism for the ROV of the present invention.
Figure 19B:
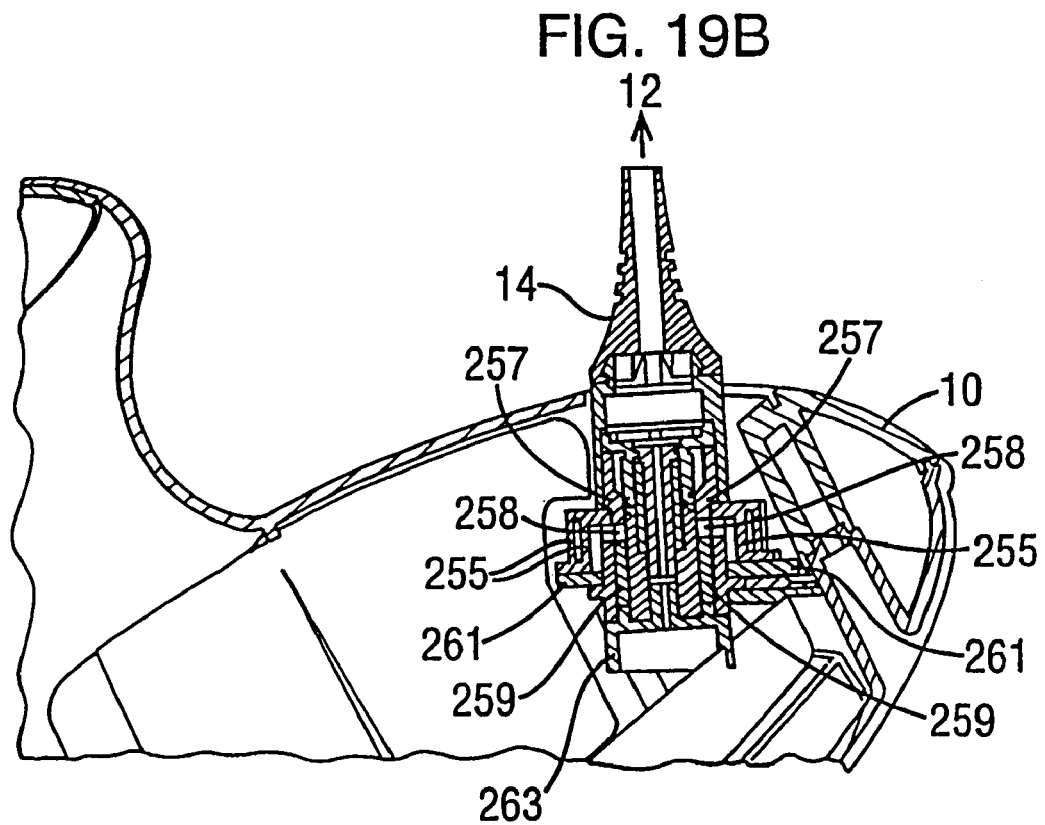

Referring now to FIGS. 19A and 19B, a preferred connector arrangement is shown. The connector comprises a bayonet 257 of the push and rotate type, such that pins 258 can rest on returns 256 of the bayonet 257. The pins 258 are provided on the fish 10. The cable, when connected to the fish 10, biases a spring housing 255 into a telescopically compressed state, the spring housing 255 comprising an outer ring and an inner ring that are spring mounted relative to each other to default into a telescopically extended orientation. The spring housing 255 enables the cable 14 to be ejected from the fish 10 if the bayonet 257 is disengaged from the pins 258.

The release mechanism to disengage the bayonet 257 from the pins 258 comprises an unlocking disc 259 that has pegs 260 for engaging slots 254 of the bayonet 257. Rotation of the unlock disc 259 will therefore rotate the bayonet 257, moving the returns 256 relative to the pins 258 such that the pins 258 no longer rest against the returns 256 of the bayonet 257. Alternatively, the pegs 260 can be arranged to move, or withdraw the pins 258 from the returns 256.

The unlock disc 259 is latched by a spring loaded release latch 261. A manual actuation of the latch 261 can release the cable 14. However, when underwater, a command from the topside 12 can be sent to activate an actuator to move the latch 261 so as to rotate the unlock disc 259. Such an actuator could be the shape memory alloy that contracts against the spring force of the latch 261.

Umbilical Cable Management

The umbilical cable is connected to a winder at the surface, and unwanted cable 14 is retained on a spool. The winder may be one of two kinds: a fixed spool winder or rotating spool winder. In order to manage 100 to 200 m of thin cable, an electrically powered winding mechanism comprising a motor and a gearbox is preferably provided.

In the case of a fixed spool, a large diameter spool is used so that minimal twisting of the cable occurs. Further, by adding a pre-twist to the cable, i.e. when reeled in, there will be a net zero amount of twist for an average deployed length of cable.

In the case of a rotating spool, there is the problem of how to couple the electrical and electronic control signals to the fixed components of the winder. This can be achieved by providing a slip ring for power, if transmitted along the cable, and, inside the spool, components to filter the signals from the power or base bandwidth. The signals (10 MHz–50 MHz) are transmitted through a small rotary transformer. By these means, there will be no interference on the video signal due to noise in the slip ring brushes either. Such a transformer can be designed to be part of two tuned circuits so as to keep separate the signals from the local command transmitter and the distant video and telemetry transmitter.

The spools can be adapted to detach itself from the winder in the event that tension in the cable approaches the cable's breaking point. The cable passes over a force sensing means of springs, pulleys, and switches so that tension information can be passed to the winder's processor. Alternatively, the rotary transformer can separate so as to release the cable.

A short pole extension can be provided for the winder so that the cable can be held clear of the sides of a boat from which the fish 10 may have been deployed.

The winder's processor is commanded from the topside computer unit 18 for powering forwards at different speeds or locking or powering in reverse at different speeds, dependant on the position of the fish 10 or the tension in the cable as determined by means of the sensors. It can also incorporate roller arms which move against strips. The movement of the cable 14 can be sensed and used to control the motor so as to power out or in the cable 14 at a known tension.

A part of the function of the topside 12 is to power all the surface electronic and electric components. For this there may be provided a 12V rechargeable battery. A small control panel is provided for the winder to allow the user to choose manually to wind the cable in or out of the winder. Also a handcrank for the winder can be provided.

Video Transmission to Topside 12

Ideally, the video signal from the underwater cameras should be transmitted to the topside 12 with as little degradation as possible. This is achieved by taking the signal from the camera and FM modulating it around 32 MHz. By occupying from 40 MHz down to 20 MHz, plenty of spectrum remains below 20 MHz for command and telemetry and other FDM channels when the cable attenuation is small.

The Video Cameras

The front camera has a pan and tilt mechanism. This allows the user to control the view to look sideways, e.g. for looking at fish or other creatures while they are swimming. However, this prevents the user from instantly seeing directly where the fish is swimming. By incorporating a forward pointing second, fixed camera on the fish 10, the user can switch to a forward looking view very rapidly so as to solve the problem of collision avoidance. At the same time, the operator can be given two focal lengths. For example, the fixed camera can be a very wide angle lens and the pan and tilt camera can be just a wide angle lens. Zoom or telephoto lenses could alternatively be provided. To save on electronics costs, it is possible at least partially to integrate the two cameras' control electronics. It is intended to use silicon CCD technology in the cameras.

Low Light Imaging

Water absorbs red light and so things look more blue the deeper one dives. Also, it gets darker with increased depth. To maintain the use of the cameras at depth, it is therefore necessary either to use a high sensitivity camera or to use a relatively high amount of onboard lighting.

The disadvantage of providing a high sensitivity camera is that the CCD cells are larger and more expensive. The disadvantage of using a high amount of light is the increased power draw from the battery 52.

Improved lighting can be provided by the use of light discharge tubes fired between frames of the video camera, e.g. xenon discharge tubes. However, continuous light can be provided by metal halide (or SOX, SON, HMI or CDM) lights, tungsten halogen lights, incandescent lights or LEDs.

Unfortunately, fluorescent discharge tubes are hard to focus, being physically very large. Metal halide, however, is very efficient but also requires control gear and only certain types are designed to warm up rapidly and to be relit when hot. Incandescent lights, although less efficient than metal halide lights, require little control gear and, like Metal halide lamps, the beam angle can be very accurately defined. By making the beam quite wide, a high brightness in the video picture is achieved, and the camera can be freely panned and tilted about the illuminated area.

If the light is more closely focused to the field of view of the camera so as to prevent illumination extending out of the field of view, i.e. for efficient use of power, with a pan and tilt camera, it is necessary to refocus the light as the camera moves. Each light can therefore have its own pan and tilt mechanism that is computer controlled so that the beams illuminate just the video camera's field of view. The beams can be made to converge so as to overcome parallax issues at close range.

Tungsten Halide lamps are very inefficient if they are dimmed. Therefore brightness control of the lamps is achieved by having several bulbs and the user can select how many are to be on rather than dimming them. One bulb can be a fixed beam with a very narrow angle, e.g. 8°, to allow the fish 10 to be steered at minimum light power, e.g. 20 W, but with good range penetration to assist in avoiding collisions with objects in the water. When the scene is to be reviewed or recorded, the other lights can be turned on. Each beam is targeted for maximum usefulness so that if only one lamp were on, it could be steered to illuminate the object of particular interest.

The lights can be non-contact connected to the fish 10, for example by an inductance coupler. For example, lamp units can themselves be a sealed unit provided with an inductance loop for threading over a magnetic core of an inductance coupler, e.g. one of the limbs of an E-shaped core. This makes replacing a bulb simple since there is no need to break any water or pressure seal.

Pan and Tilt Mechanism

In the pan and tilt mechanism, it is not only desirable to position mechanically the camera or the light. It is also desirable to allow the operator (and the computer systems) to know the axis angles of the camera and/or lights.

Referring now to FIGS. 12A to 12J, there is shown a preferred embodiment of the pan and tilt mechanism of the present invention. It does not matter if tilting the mechanism also pans the camera, or vice versa. For example, the two axes (pan 251, tilt 253) need not be vertical and horizontal. The system's software can compensate for the interaction between the pan mechanism and the tilt mechanism by applying a corrective drive to the appropriate mechanism.

A standard high-quality CCD camera 225 with wide-angle lens, fitted to a printed circuit board 249, is provided mounted in a gimballed frame 233 driven by small electric motors 235,237 so as to provide a panning and tilting action. The camera 225 looks out of the pressure housing through the double layer dome 34.

The pan and tilt motors 235,237 drive, via band connectors 239, lead nuts/wheels 243 which by their rotation are caused to move along fixed threaded rods, or bolts 241, 242. The nuts are connected to the gimballed frame 233. The rods 241,242 are substantially semi-circular so as to provide the rotational motion to the gimballed frame 233.

The first rod 241 is centered about the tilt axis 253 and the second rod 242 is centered about the pan axis 251. A pair of linear potentiometers 245 (only one shown in FIG. 12A, for the tilt measurement) are operatively connected to the gimballed frame 233 for determining the angle of pan or tilt thereof. The connection may be by means of a worm gear (not shown) or otherwise.

FIGS. 12C to 12F show various positions that the camera 225 can be adjusted to by means of the pan and tilt mechanism.

Pressure Connector

It may be desirable to pass cables 93 directly into the housing. This is problematic since water ingress into the housing is particularly undesirable. FIGS. 13A and 13B show an embodiment of a water tight pressure connector.

The connector has an outer sleeve 101 of a size substantially corresponding to, but slightly smaller than, the size of the aperture, and an epoxy filled core 103 supporting the cable to be extended through the pressure wall within the sleeve, the sleeve having two pressure resisting flanges 105,107 thereon, one for engaging against an outer surface of the pressure wall 109 adjacent the aperture, and one extending radially inwardly from the inner surface of the sleeve for resisting movement of the epoxy 103 when under pressure. The juncture between the epoxy and the second flange may be provided by a pressure resistant planar barrier 111. This could be a printed circuit board having through pins 99. The pins 99 are connected to the wires by soldering the bare ends 95 of the wires 93 to the pins 99. Typically the connector will extend 22 mm into the pressure wall. Twin o-rings 97 are provided to secure the connector in the aperture.

Two embodiments of a further type of pressure connector are shown in FIGS. 13C and 13D. They enable the passage of wires from within a pressure housing, out of the pressure housing.

The pressure housing comprises an upper shell 401, a lower shell 403, two o-rings 405,407, and internal electrical components 409.

Sandwiched at a first end thereof, between the upper and lower shells, there is a flexible or rigid printed circuit 411. On the other end of the printed circuit 411, as shown in FIG. 13C, there is a potted connection 413, such as in resin, as is well known in the art. However, a second pressure housing could instead be sandwiched on that end, the printed circuit 411 providing a connection between the two housings.

The o-rings encapsulate a portion 415 of printed circuit 411, and by clamping the two shells together, for example by screws or bolts, the encapsulated portion 415 can be kept pressure and water sealed within the cavity formed within the two shells 401,403. The electrical component 409 can therefore be safely connected to the printed circuit 411 at the encapsulated portion.

Thrusters 36,42

Figure 2:
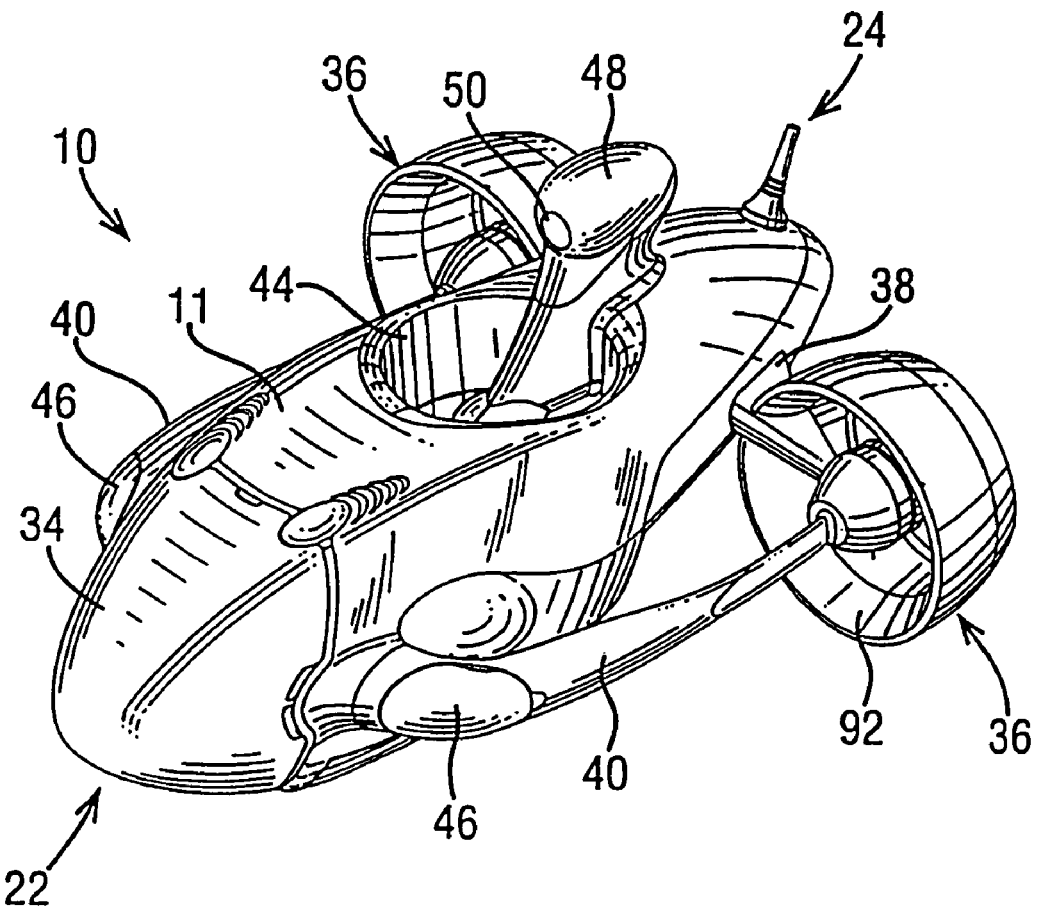
FIG. 2 is a perspective view of a fish of the present invention.
Figure 15:
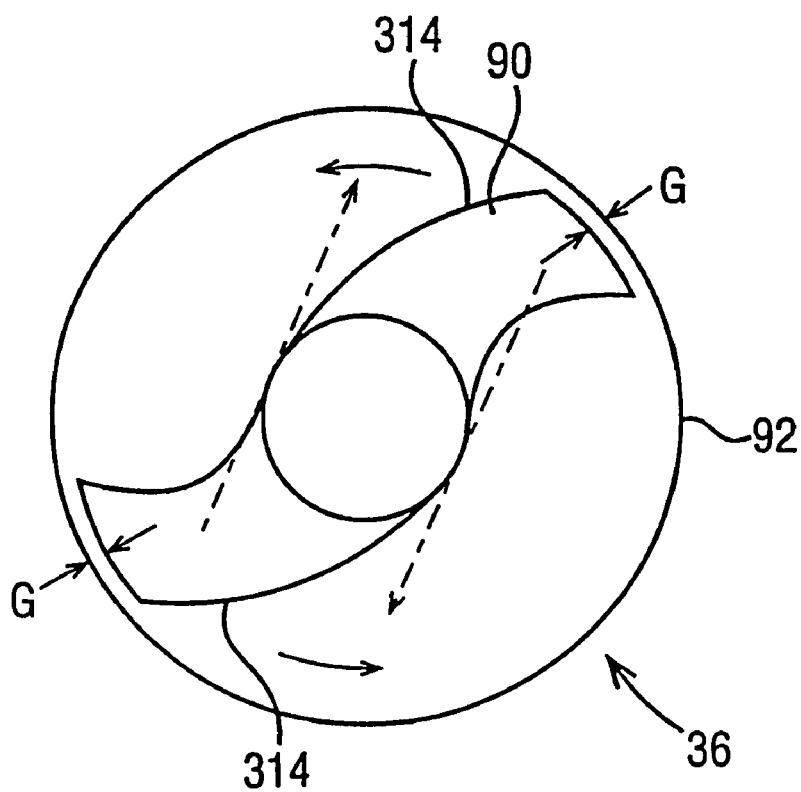
FIG. 15 is a rear plan view of the propeller of the present invention.

Referring now to FIGS. 2, 3 and 15, the side thrusters 36 each comprise a propeller 90. They may be of conventional design. However, preferably they are designed as shown in FIG. 15.

When the fish 10 is being driven at a low velocity, the effectiveness of each propeller 90 can be increased by rotating it inside a specially shaped tube called a Kort 92. This itself provides about a 25% increase in thrust. However, at higher speeds, this arrangement would not provide such an improvement because the drag of the fish 10 is increased by the Kort 92. Preferably the gap G between the propeller 90 and the Kort 92 is kept small. Ideally, for best hydrodynamic performance, there is no gap G, i.e. an interference fit.

In order to improve the thruster's resilience to weed or sand blockage, the propeller 90 is made from a compliant or resilient material. Such a propeller 90, in normal use, maintains an interference fit with the Kort 92. However it can bend and let sand or weed pass through by opening a gap under the increased force caused by the sand or weed. After the sand or weed has passed through the Kort 92, the propeller 90 springs back to reinstate the interference fit.

Referring now to FIG. 15, the leading edges 314 of the propeller 90 are profiled to sweep backwards, from an initially asymptropic direction 315 from the outer radius of the central cone 316 of the propeller 90. This removes all ledges from the propeller 90 that weed could get stuck on, further improving weed resistance of the thrusters. The propeller shape 90 could be symmetrical, thereby defining an approximately triangular shape, so that weed does not catch on the propeller 90 in either drive direction.

The propellers are mounted onto the propeller drive shaft via a slipping clutch mechanism. If the blades are obstructed by something solid, such as a finger or hand, the slipping clutch will not engage and the blades will not turn, thereby reducing the risk of injury. Further, due to both the usually low rotational speeds involved for driving the fish due to their thrust efficiency, and the lightweight construction of the propellers, there will be little momentum in the propellers, so they will stop easily.

Conventionally, the propeller 90 is driven by hydraulic motors or by enclosing an electric motor inside a pressure chamber. Such chambers generally either contain air at atmospheric pressure, or use pressurized oil.

The disadvantage of air is that the chamber needs to be extremely strong to survive the pressure applied by the water at depth. Further, the shaft bearings have to resist water ingress at these pressures. This is achieved with tight seals. However, this causes frictional power loss.

Oil filled chambers do not require the strength of a pressure vessel. However, the disadvantage is that the motor has to rotate in a viscous fluid.

An alternative method devised in the art comprises having the motor in an air chamber, but to have the shaft to the propeller passing through an intermediate oil chamber. However, this is expensive to implement.

Figure 14:
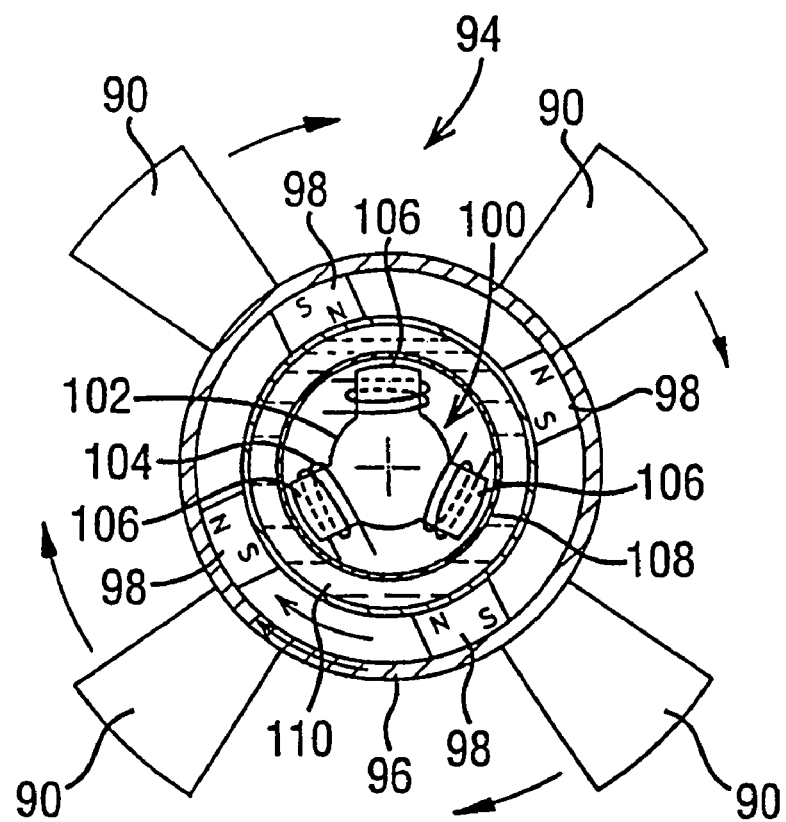
FIG. 14 is schematic section through the motor of the present invention.

A preferred motor 94 that overcomes some of the above difficulties is shown in FIG. 14. The motor 94 comprises a molded rotor having propellers 90, a backing ring 96 and permanent magnets 98, and a fixed stator 100 having a core 102 and coil windings 104 on limbs 106 of the core 100. The stator 100 is stationary and sealed from water ingress by a pressure housing 108. The rotor rotates about the stator 100 because a torque is created between the permanent magnets on the rotor and the electromagnets of the stator 100. The strength and direction of the electromagnets are determined by the current in the coil windings 104 on the core 102. The motor 94 is a flooded motor and water 110 penetrates between the rotor and the stator 100. Magnetic flux will pass through the water 110. At low rotating speeds of the rotor, and therefore the propellers 90, hydrostatic resistance caused by the water between the rotor and the stator 100 is negligible.

In order to survive in sea water, corrodable components should be protected from the sea water, e.g. by encasing them in plastic. The motor uses permanent magnets on the rotor. These can be made out of magnetically loaded nylon (e.g. using ferrite) or some other plastic so that the encapsulation has a motor function as well. The entire rotor assembly comprising the magnet ring, the backing ring (normally having a steel reinforcement ring) and the propeller, and the front bearing connecting the rotor to the supporting arm 40 can be molded in one operation.

Two kinds of bearing may be provided: a rim bearing on the magnet ring or a more conventional center shaft bearing.

The arm 40 is centered on the rotor and maintains the magnets 98 and propeller assembly 90 centered on the stator assembly 100. Desirable motor characteristics with the load on the propeller from the water without making the total motor weight too heavy are achieved by providing 54 magnetic poles. Only 4 are shown in FIG. 14.

The fundamental motor technology is preferably of the 3-phase brushless DC type. However, other suitable technologies include induction or variable reluctance motors or stepper motors. However, induction motor losses in small power motors of this type tend to be very high. Variable reluctance (or switched reluctance) motors, on the other hand, do not need a rotor magnet or a backing ring assembly—the propeller itself would be magnetized. However, the rotor position would need to be continuously sensed. A more conventional construction is therefore preferred.

The rotor position is sensed in a brushless DC motor by having the rotor magnets alter the state of Hall-effect devices. These are positioned between the stator poles. This arrangement allows adequate performance in both the forward and reverse directions. To increase the forward performance, the timing can be altered either by providing a second set of Hall-effect devices positioned alongside the magnet ring at a different position to those between the stator poles or by an electronic adjustment of the timing.

The propeller is potentially dangerous on land. Therefore, in the electronic control system of the fish 10, a means to prevent the propellers from turning other than at low speeds when the fish is out of the water is provided. Water can be sensed by optical devices such as those made by Honeywell. Their sensors also serve to indicate to the pressure software the change between the fish 10 being in air and being in water so as to provide a zero reference for the pressure transducer.

Part of the automatic safety control is also to reduce the performance of the fish 10, i.e. its speed, in shallow water to avoid potential harm to boats or swimmers (or to the fish).

Different combinations of thrusters may be used from a single thruster to a plurality of thrusters. For example, in a four thruster fish, there would be two horizontal thrusters and two vertical thrusters. The horizontal thrusters provide force for surge and yaw. The vertical thrusters provide force for heave and pitch. Tail fins may also be fitted to increase the stability of the fish 10 when swimming.

In the embodiment shown there is only one vertical thruster. Heave and pitch does not need to be adjusted since the fish 10 is fully balanced.

The vertical thrusters have a symmetrical Kort design because they will probably spend as much time in one direction as the other.

The fish 10 is designed to be balanced and gravity stabilized for roll and pitch. While this is desirable for level "flight", maneuvering the fish at a constant non-level pitch will require constant corrective drive from the vertical thrusters. Adjustable hydroplanes could be provided to counteract this.

To assist in balancing the fish, two pressure housings could be provided, a fore housing and an aft housing. The housings contain all the components that need to be kept away from moisture and high pressure, i.e. the electrical components.

Motion and hydrodynamics of the fish 10, and the drag effect of the cable 14, can alter the stability of the fish 10. The fish 10 should be as balanced as possible. Fins may be used to counteract forces generated when the fish moves.

Further, the horizontal thrusters 36 may be positioned slightly forward of the center of drag to increase forward stability. However, in the embodiments shown, the horizontal thrusters 36 are positioned close to the back of the fish 10.

The horizontal thrusters 36 have an asymmetrical Kort design. This will enable a more efficient forward thrust than reverse thrust, for example, since forward thrust will be used more often.

The horizontal thrusters 36 may be large compared to the vertical thrusters. For example, horizontal thrusters 36 can have a 70 W motor, whereas the vertical thrusters can have a 35 W motor. However, the horizontal and vertical motors are preferably identical to standardize the components.

Buoyancy and Recovery

Buoyancy means can be provided in the fish for automatically regulating its buoyancy. This is likely to be one or more flexible trapped air components such as a rubber or polystyrene foam. The buoyancy can be such that the fish, in the absence of a thrust force, will float up to the surface, i.e. the fish can be designed to be positively buoyant. This however, has a disadvantage that keeping the fish at a constant depth would require a continuous power drain on the vertical thrusters.

By making the fish (with battery and options) neutrally buoyant at a depth of about 5 m, there will be minimum inherent uplift to combat. Above this depth, the foam will expand to provide a larger displacement so as to make the fish more buoyant. Below a depth of 5 m, the foam will collapse under the pressure of the water thereby decreasing its buoyancy.

For autonomous recovery of the fish 10 from depths below 5 m, use of the vertical thruster(s) will usually be necessary. However, other buoyancy means could include self-inflating devices which could be deployed to raise the fish 10 to the water's surface, or the dropping of ballast weights.

Autonomous recovery could be initiated automatically if the connection to the topside is severed. On release or severing of the cable 14, the fish could either simply rise to the surface, or it could execute a series of movements so as to return itself approximately to the deployment point. The recovery could be aided by the provision or storage of information such as depth, heading and location of the fish 10 relative to its point of deployment. This information could be sent by the topside 12 via the cable 14 from time to time, or logged by the fish 10. Other means of recovery could include communication of information or instructions by the topside 12 via a medium other than the cable 14, such as by ultrasonic, or, once on the surface, by radio frequency transmission.

For this purpose, the fish and preferably also the topside could be fitted with a global position system to enable the fish to automatically seek and find the launch location.

Autolocating of the Fish Underwater

Figure 17:
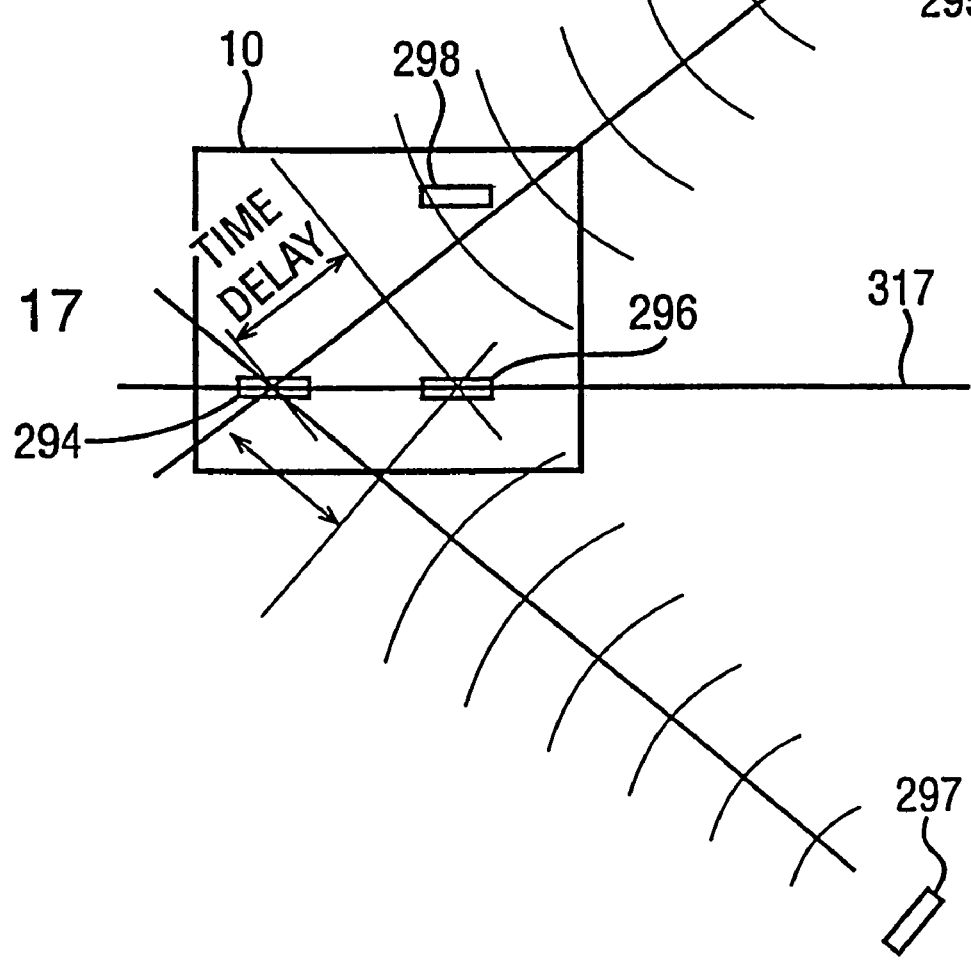
FIG. 17 schematically shows a position locating means for the ROV of the present invention.

Underwater locating of the fish 10 can be important to inform the operator of the position of the fish 10. Referring now to FIG. 17, this is done by ultrasonic means.

Sound travels at a constant speed through water. Therefore by determining the time taken for the sound to travel to a receiver 294 on the fish 10 from an ultrasound transmitter 295, for example on the boat carrying the topside 12, the distance of the fish 10 from the ultrasound transmitter 295 can be determined. The time taken can be easily measured. Such ranging can be either 1) by timing it using an electric signal through the cable 14, or 2) by timing the "round trip" passage of the ultrasound signal.

Using method 1, a communication in the cable 14 can signify both the start of the transmission signal and the occurrence of its reception at the fish 10. The period between these can be timed.

Using method 2, two pairs of receivers and transmitters, each sharing a transducer, are used. A transmitter at the first transducer 294, for example on the fish 10, transmits an ultrasound signal. When the receiver on the second transducer 295 at the other end, e.g. on the boat, receives the signal, it transmits back a return ultrasound signal to the first transducer 294. A timer in the first transducer 294 measures the total time period. This time period comprises three parts: two are the transmit times of the ultrasound pulse through the water. The third is the delay at the second transducer 295 for initiating the return signal. The delay is fixed in time and can be removed with calibration.

By using a second reply transducer 297, at a second known position, such as from a fixed buoy, the position of the fish 10 can be triangulated.

In order to determine the azimuth of the fish 10, i.e. its orientation, the strength of the return pulse can be measured by the fish 10 using a directional transducer; by rotating the whole fish 10 in the water, or else having a means to rotate the transducer, the fish can find out the direction from which the directional transducer gives the highest signal, and hence infer the direction of the return transmitter. A more preferred method however, as shown in FIG. 17, is to use the time the pulse takes to transit across the ROV; two separated transducers 294,296 are provided on the fish 10, a known distance apart. They will receive the return signal at different times. The time difference (or possibly also the phase difference) will indicate the direction of the return transmitter.

Using these positional triangulation techniques will generate two possible positions or orientations for any set of readings. It may be possible to adduce which of the two is correct by continuous monitoring of the control commands sent to the fish 10. However, certainty can be provided by using a third transducer 298 having a receiver. This third transducer must be positioned a distance away from the intersecting line 317 between the other two transducers so as to set up a triangular mapping field for determining the exact position of the fish 10. The third transducer 298 is preferably provided on the fish 10.

For a fish 10 provided with three transducers, one could be positioned near the front of the fish 10 and the other two can be positioned on the Korts 92 of the horizontal thrusters 36. In this manner, all three can be positioned in the same horizontal plane to simplify the mathematics involved.

Underwater Communication Means

Figure 20A:
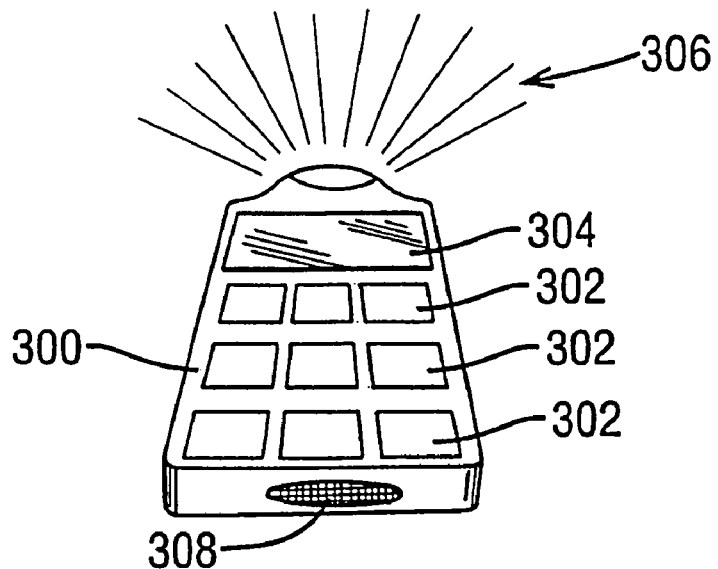
FIGS. 20A, 20B and 20C show a communications getup for the fish of the ROV of the present invention.

It would be desirable to use the fish as a tool for accompanying a diver or divers on a dive. It could enable communications between the diver and the surface or between divers. Although sound transmits in water, divers cannot speak without changing the apparatus by which they breath. Therefore, divers carry small handset devices 300 for using short text messaging, such as that used on mobile phones. FIG. 20A shows a typical handset 300.

The buttons 302 on the handset device 300 for writing the messages are large enough for divers wearing diving gloves still to use them. Ultrasonic communication 306 between the handset device 300 and the fish 10 allow the messages to be communicated therebetween. As shown in FIG. 20C, the fish 10 is provided with an ultrasonic transducer crystal 310 on the front thereof allowing bi-directional communication 312 between the handsets 300 and the fish 10.

The messages can be displayed to divers using a text screen 304 or translated to sound messages for a speaker 308 on the handset 300, or near their ears.

Instead of using the fish 10 as a central communication processor, each handset may have its own communication processor so that communication can occur directly between handsets, or between the handset and an communications device at the surface. For example, messages may be picked up by ultrasonic transducers on the hull of a boat at the surface so that people in boats can communicate with divers below the surface.

The fish 10 may be fitted with a transducer for relaying messages on the cable 14 to and from the topside 12. At the topside 12 the messages can be displayed on the monitor 20.

Figure 20B:
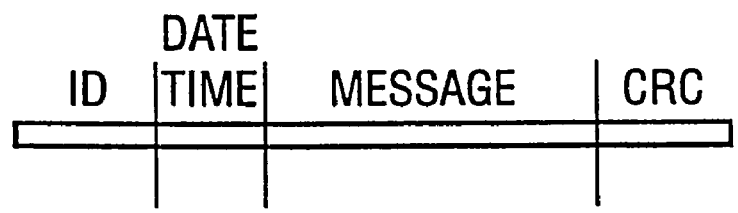
Figure 20C:
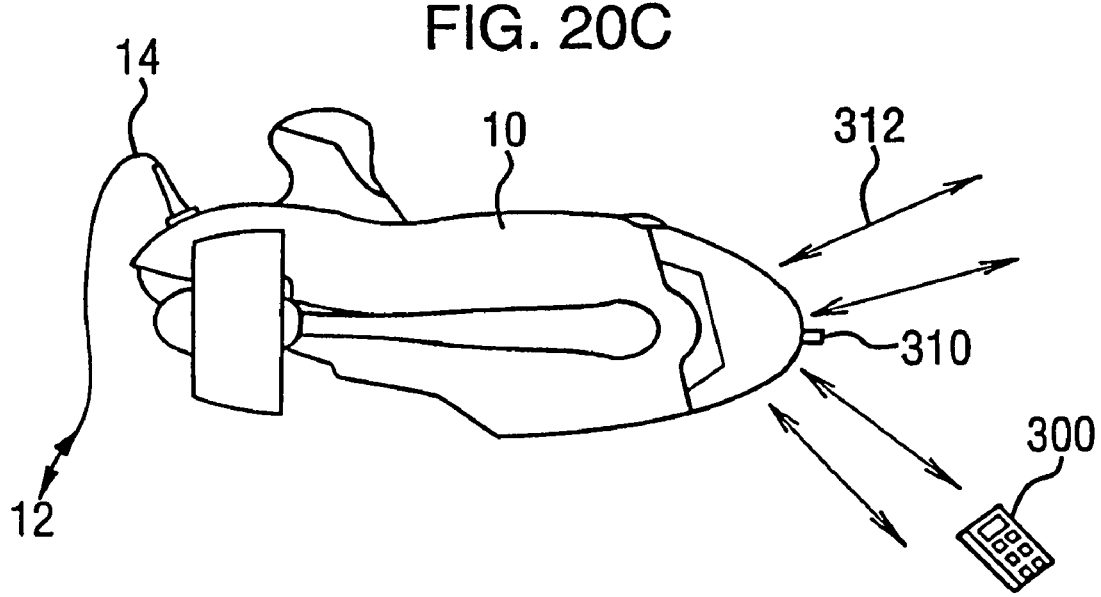

The message burst, as shown in FIG. 20B, comprises an identifying portion, a date and time stamp, the message and a checksum (CRC).

The communication means could be one of the "options". Communication at 300 bits per second would be sufficiently fast for text messaging.

Fish Intelligence

Motion of the fish 10 in the water may be influenced by waves or tugging on the cable. The fish can have automated thruster controls for automatically correcting any yaw caused by this. For example, the controller could be connected to an electronic compass. It would automatically energize the thrusters so as to oppose rotation caused by the drag or other force. This would allow the operator to provide instructions as to the desired heading and the fish 10 would determine the thruster force necessary to achieve that heading.

Similarly the fish 10 can be made to oppose forces that affect its depth by having its depth or pressure gauge connected to a control system which energizes the vertical thruster(s) as necessary. In this instance the operator controls not the amount of vertical thrust but instead instructs the controller as to the desired depth.

Sensors may also be used in conjunction with the automated positional control mechanisms of the fish 10 to maintain the fish 10 at a fixed distance above the seabed or lakebed by having a control system which commands the vertical thruster so that the fish's height above the seabed is maintained. The distance can be monitored by an ultrasonic ranging transducer fitted to the fish 10. Similarly, the fish's depth could be maintained by an ultrasonic reflection from the surface of the water rather than by a depth transducer.

The fish 10 could be fitted with gyroscopes both to increase the resistance of the fish to changes in its inertia and to enable a sensing of the external force being applied to the fish 10. For example the gyroscope could be fitted within a sprung strain-gauge assembly. This would both provide increased time periods for the computer's intelligence to react to external forces acting on the fish 10, and a signal from which to evaluate the response required.

The present invention has been described above purely by way of example. It should be noted that modifications in detail may be made within the scope of the invention as defined in the claims.

What is claimed is:

1. A fish for a recreational ROV comprising at least one thruster for propelling the fish through water, a release mechanism for an umbilical cable attachable thereto, the release mechanism being activatable remote from the mechanism, and a controller responsive to the activation of the release mechanism for controllably driving the fish to the topside during a recovery procedure by controllably operating the at least one thruster to effect one or more controlled movements of the fish during the recovery procedure.

2. The fish of claim 1, wherein the fish is provided with twin, side-mounted, horizontal thrusters, and with a position for attaching the umbilical cable thereto at a location directly at or substantially above the mid-point of a line between the twin thrusters.

3. The fish of claim 1, wherein the release mechanism is activatable by a user remote from the mechanism.

4. The fish of claim 1, wherein the release mechanism includes a logic circuit programmed to release it if, in use, the umbilical cable is snapped.

5. The fish of claim 1, wherein the release mechanism includes a spring mechanism for popping out the umbilical cable from the mechanism.

6. The fish of claim 1, wherein the release mechanism is operated by contraction of a shape memory alloy component.

7. The fish of claim 1, wherein the release mechanism comprises pins on the fish, the pins being engagable with a bayonet fitting on an end of the umbilical cable.

8. The fish of claim 7, wherein the pins are retractable to release the bayonet fitting from engagement with the fish.

9. A fish for an ROV comprising a release mechanism for an umbilical cable attachable thereto, the release mechanism being activatable remote from the mechanism and including pins on the fish that are engagable with a bayonet fitting on an end of the umbilical cable, and wherein the pins are mounted on an unlocking disk, the rotation of which disengages the pins from slots on the bayonet fitting.

10. A fish for an ROV comprising a release mechanism for an umbilical cable attachable thereto, the release mechanism being activatable remote from the mechanism, and a controller for detecting loss of data communication with a topside through the umbilical cable and in response thereto initiating a recovery procedure to return the fish to the topside.

11. The fish of claim 10, wherein the recovery procedure comprises a first phase of surfacing and a second phase of driving the fish to the topside using a radio communication link between the fish and the topside.

12. The fish of claim 11, wherein the fish comprises a global positioning system used during the second phase for controlling the driving of the fish to the topside.

13. The fish of claim 10, wherein the controller compiles a movement log of the fish during use and is operable to control the driving of the fish to the topside during the recovery procedure based on the movement log.

14. The fish of claim 10, wherein the recovery procedure comprises actuating the release mechanism for disconnecting the umbilical cable.

15. A fish for a recreational ROV comprising a release mechanism for an umbilical cable attachable thereto, the release mechanism being activatable remote from the mechanism, and a controller responsive to the activation of the release mechanism for initiating a recovery procedure to return the fish to the topside, and wherein the recovery procedure comprises a first phase of surfacing and a second phase of driving the fish to the topside using a radio communication link between the fish and the topside.

16. The fish of claim 15, wherein the fish comprises a global positioning system used during the second phase for controlling the driving of the fish to the topside.

17. The fish of claim 1, wherein the controller compiles a movement log of the fish during use and is operable to control the driving of the fish to the topside during the recovery procedure based on the movement log.

* * * * *